US011378481B2

(12) United States Patent
Gibson et al.

(10) Patent No.: US 11,378,481 B2
(45) Date of Patent: Jul. 5, 2022

(54) HYDRANT NOZZLE CAP

(71) Applicant: Mueller International, LLC, Atlanta, GA (US)

(72) Inventors: Daryl Lee Gibson, Cleveland, TN (US); William Mark O'Brien, Toronto (CA); Sebastien Perrier, Toronto (CA); Paul S. Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 296 days.

(21) Appl. No.: 16/428,744

(22) Filed: May 31, 2019

(65) Prior Publication Data

US 2020/0378859 A1 Dec. 3, 2020

(51) Int. Cl.
*E03B 7/00* (2006.01)
*E03B 9/02* (2006.01)
*F16L 55/115* (2006.01)
*G01M 3/24* (2006.01)

(52) U.S. Cl.
CPC ............... *G01M 3/24* (2013.01); *E03B 7/003* (2013.01); *E03B 9/02* (2013.01); *F16L 55/1152* (2013.01); *F16L 55/1155* (2013.01)

(58) Field of Classification Search
CPC ...... G01M 3/24; G01M 3/243; F16L 55/1155; F16L 55/1152; F16L 55/1108; E03B 9/02; E03B 9/06; E03B 7/003; E03B 9/04; A47L 11/302; F16K 27/00
USPC ......................................................... 73/592
See application file for complete search history.

(56) References Cited

U.S. PATENT DOCUMENTS

| | | | |
|---|---|---|---|
| 1,738,094 | A | 12/1929 | Caldwell |
| 2,171,173 | A | 8/1939 | Coyer |
| 3,254,528 | A | 6/1966 | Michael |
| 3,592,967 | A | 7/1971 | Harris |
| 3,612,922 | A | 10/1971 | Furnival |
| 3,662,600 | A | 5/1972 | Rosano, Jr. et al. |
| 3,673,856 | A | 7/1972 | Panigati |
| 3,815,129 | A | 6/1974 | Sweany |
| 4,000,753 | A | 1/1977 | Ellis |
| 4,056,970 | A | 11/1977 | Sollish |
| 4,083,229 | A | 4/1978 | Anway |

(Continued)

FOREIGN PATENT DOCUMENTS

| | | |
|---|---|---|
| AU | 2011265675 | 5/2015 |
| AU | 2015202550 | 11/2017 |

(Continued)

OTHER PUBLICATIONS

Speacialinsert, Inserts for plastic (Year: 2016).*

(Continued)

*Primary Examiner* — Michael P Nghiem
*Assistant Examiner* — Dacthang P Ngo
(74) *Attorney, Agent, or Firm* — Taylor English Duma LLP

(57) ABSTRACT

Example aspects of a nozzle cap for a fire hydrant and a method for manufacturing a nozzle cap to detect leaks in a fluid system are disclosed. The nozzle cap for a fire hydrant can comprise a cap body, the cap body comprising an inner housing and an outer housing, the outer housing defining a cavity; a vibration sensor received within the cavity and configured to detect leaks in a fluid system connected to the fire hydrant; and a metal insert contacting the vibration sensor and the inner housing.

29 Claims, 12 Drawing Sheets

(56) References Cited

U.S. PATENT DOCUMENTS

| | | |
|---|---|---|
| 4,333,028 A | 6/1982 | Panton |
| 4,431,873 A | 2/1984 | Dunn et al. |
| 4,462,249 A | 7/1984 | Adams |
| 4,467,236 A | 8/1984 | Kolm et al. |
| 4,543,817 A | 10/1985 | Sugiyama |
| 4,796,466 A | 1/1989 | Farmer |
| 4,844,396 A | 7/1989 | Norton |
| 4,893,679 A | 1/1990 | Martin et al. |
| 4,930,358 A | 6/1990 | Motegi et al. |
| 4,984,498 A | 1/1991 | Fishman |
| 5,038,614 A | 8/1991 | Bseisu |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,298,894 A | 3/1994 | Cerny et al. |
| 5,301,985 A | 4/1994 | Terzini |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A | 5/1995 | Savic |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,195 A | 1/1998 | Kurisu et al. |
| 5,708,211 A | 1/1998 | Jepson et al. |
| 5,746,611 A | 5/1998 | Brown et al. |
| 5,754,101 A | 5/1998 | Tsunetomi et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,898,412 A | 4/1999 | Jones et al. |
| 5,907,100 A | 5/1999 | Cook |
| 5,965,818 A | 10/1999 | Wang |
| 5,970,434 A | 10/1999 | Brophy et al. |
| 5,974,862 A | 11/1999 | Lander |
| 5,987,990 A | 11/1999 | Worthington et al. |
| 6,000,277 A | 12/1999 | Smith |
| 6,000,288 A | 12/1999 | Kwun et al. |
| 6,003,376 A | 12/1999 | Burns et al. |
| 6,023,986 A | 2/2000 | Smith et al. |
| 6,035,717 A | 3/2000 | Carodiskey |
| 6,058,957 A | 5/2000 | Honigsbaum |
| 6,076,407 A | 6/2000 | Levesque et al. |
| 6,082,193 A | 7/2000 | Paulson |
| 6,089,253 A | 7/2000 | Stehling et al. |
| 6,102,444 A | 8/2000 | Kozey |
| 6,104,349 A | 8/2000 | Cohen |
| 6,125,703 A | 10/2000 | MacLauchlan et al. |
| 6,127,823 A | 10/2000 | Atherton |
| 6,127,987 A | 10/2000 | Maruyama et al. |
| 6,133,885 A | 10/2000 | Luniak et al. |
| 6,138,512 A | 10/2000 | Roberts |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,181,294 B1 | 1/2001 | Porter et al. |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,343,510 B1 | 2/2002 | Neeson et al. |
| 6,363,788 B1 | 4/2002 | Gorman et al. |
| 6,389,881 B1 | 5/2002 | Yang et al. |
| 6,401,525 B1 | 6/2002 | Jamieson |
| 6,404,343 B1 | 6/2002 | Andou et al. |
| 6,442,999 B1 | 9/2002 | Baumoel |
| 6,450,542 B1 | 9/2002 | McCue |
| 6,453,247 B1 | 9/2002 | Hunaidi |
| 6,470,749 B1 | 10/2002 | Han et al. |
| 6,530,263 B1 | 3/2003 | Chana |
| 6,561,032 B1 | 5/2003 | Hunaidi |
| 6,567,006 B1 | 5/2003 | Lander et al. |
| 6,578,422 B2 | 6/2003 | Lam et al. |
| 6,595,038 B2 | 7/2003 | Williams et al. |
| 6,606,059 B1 | 8/2003 | Barabash |
| 6,624,628 B1 | 9/2003 | Kwun et al. |
| 6,639,562 B2 | 10/2003 | Suganthan et al. |
| 6,647,762 B1 | 11/2003 | Roy |
| 6,651,503 B2 | 11/2003 | Bazarov et al. |
| 6,657,021 B2 | 12/2003 | Chamayou et al. |
| 6,666,095 B2 | 12/2003 | Thomas et al. |
| 6,667,709 B1 | 12/2003 | Hansen et al. |
| 6,707,762 B1 | 3/2004 | Goodman et al. |
| 6,710,600 B1 | 3/2004 | Kopecki et al. |
| 6,725,705 B1 | 4/2004 | Huebler et al. |
| 6,734,674 B1 | 5/2004 | Struse |
| 6,745,136 B2 | 6/2004 | Lam et al. |
| 6,751,560 B1 | 6/2004 | Tingley et al. |
| 6,763,730 B1 | 7/2004 | Wray |
| 6,772,636 B2 | 8/2004 | Lam et al. |
| 6,772,637 B2 | 8/2004 | Bazarov et al. |
| 6,772,638 B2 | 8/2004 | Matney et al. |
| 6,781,369 B2 | 8/2004 | Paulson et al. |
| 6,782,751 B2 | 8/2004 | Linares et al. |
| 6,789,427 B2 | 9/2004 | Batzinger et al. |
| 6,791,318 B2 | 9/2004 | Paulson et al. |
| 6,799,455 B1 | 10/2004 | Neefeldt et al. |
| 6,799,466 B2 | 10/2004 | Chinn |
| 6,813,949 B2 | 11/2004 | Masaniello et al. |
| 6,813,950 B2 | 11/2004 | Glascock et al. |
| 6,816,072 B2 | 11/2004 | Zoratti |
| 6,820,016 B2 | 11/2004 | Brown et al. |
| 6,822,742 B1 | 11/2004 | Kalayeh et al. |
| 6,843,131 B2 | 1/2005 | Graff et al. |
| 6,848,313 B2 | 2/2005 | Krieg et al. |
| 6,851,319 B2 | 2/2005 | Ziola et al. |
| 6,889,703 B2 | 5/2005 | Bond |
| 6,904,818 B2 | 6/2005 | Harthorn et al. |
| 6,912,472 B2 | 6/2005 | Mizushina et al. |

(56) References Cited

U.S. PATENT DOCUMENTS

| | | |
|---|---|---|
| 6,920,792 B2 | 7/2005 | Flora et al. |
| 6,931,931 B2 | 8/2005 | Graff et al. |
| 6,935,178 B2 | 8/2005 | Prause |
| 6,945,113 B2 | 9/2005 | Siverling et al. |
| 6,957,157 B2 | 10/2005 | Lander |
| 6,968,727 B2 | 11/2005 | Kwun et al. |
| 6,978,832 B2 | 12/2005 | Gardner et al. |
| 7,051,577 B2 | 5/2006 | Komninos |
| 7,080,557 B2 | 7/2006 | Adnan |
| 7,109,929 B1 | 9/2006 | Ryken, Jr. |
| 7,111,516 B2 | 9/2006 | Bazarov et al. |
| 7,140,253 B2 | 11/2006 | Merki et al. |
| 7,143,659 B2 | 12/2006 | Stout et al. |
| 7,171,854 B2 | 2/2007 | Nagashima et al. |
| 7,231,331 B2 | 6/2007 | Davis |
| 7,234,355 B2 | 6/2007 | Dewangan et al. |
| 7,240,574 B2 | 7/2007 | Sapelnikov |
| 7,255,007 B2 | 8/2007 | Messer et al. |
| 7,261,002 B1 | 8/2007 | Gysling et al. |
| 7,266,992 B2 | 9/2007 | Shamout et al. |
| 7,274,996 B2 | 9/2007 | Lapinski |
| 7,284,433 B2 | 10/2007 | Ales et al. |
| 7,293,461 B1 | 11/2007 | Girndt |
| 7,299,697 B2 | 11/2007 | Siddu et al. |
| 7,310,877 B2 | 12/2007 | Cao et al. |
| 7,328,618 B2 | 2/2008 | Hunaidi |
| 7,331,215 B2 | 2/2008 | Bond |
| 7,356,444 B2 | 4/2008 | Blemel |
| 7,360,462 B2 | 4/2008 | Nozaki et al. |
| 7,373,808 B2 | 5/2008 | Zanker et al. |
| 7,380,466 B2 | 6/2008 | Deeg |
| 7,383,721 B2 | 6/2008 | Parsons et al. |
| 7,392,709 B2 | 7/2008 | Eckert |
| 7,405,391 B2 | 7/2008 | Ogisu et al. |
| 7,412,882 B2 | 8/2008 | Lazar et al. |
| 7,412,890 B1 | 8/2008 | Johnson et al. |
| 7,414,395 B2 | 8/2008 | Gao et al. |
| 7,426,879 B2 | 9/2008 | Nozaki et al. |
| 7,458,267 B2 | 12/2008 | McCoy |
| 7,475,596 B2 | 1/2009 | Hunaidi et al. |
| 7,493,817 B2 | 2/2009 | Germata |
| 7,523,666 B2 | 4/2009 | Thompson et al. |
| 7,526,944 B2 | 5/2009 | Sab et al. |
| 7,530,270 B2 | 5/2009 | Nozaki et al. |
| 7,543,500 B2 | 6/2009 | Litzenberg et al. |
| 7,554,345 B2 | 6/2009 | Vokey |
| 7,564,540 B2 | 7/2009 | Paulson |
| 7,587,942 B2 | 9/2009 | Smith et al. |
| 7,590,496 B2 | 9/2009 | Blemel |
| 7,596,458 B2 | 9/2009 | Lander |
| 7,607,351 B2 | 10/2009 | Allison et al. |
| 7,623,427 B2 | 11/2009 | Jann et al. |
| 7,647,829 B2 | 1/2010 | Junker et al. |
| 7,650,790 B2 | 1/2010 | Wright |
| 7,657,403 B2 | 2/2010 | Stripf et al. |
| 7,668,670 B2 | 2/2010 | Lander |
| 7,680,625 B2 | 3/2010 | Trowbridge et al. |
| 7,690,258 B2 | 4/2010 | Minagi et al. |
| 7,694,564 B2 | 4/2010 | Brignac et al. |
| 7,696,940 B1 | 4/2010 | MacDonald |
| 7,711,217 B2 | 5/2010 | Takahashi et al. |
| 7,751,989 B2 | 7/2010 | Owens et al. |
| 7,810,378 B2 | 10/2010 | Hunaidi et al. |
| 7,980,317 B1 | 7/2011 | Preta et al. |
| 8,319,508 B2 | 11/2012 | Vokey |
| 8,353,309 B1 | 1/2013 | Embry et al. |
| 8,614,745 B1 | 12/2013 | Wasmeyyah |
| 8,668,206 B2 | 3/2014 | Ball |
| 8,674,830 B2 | 3/2014 | Lanham et al. |
| 8,843,241 B2 | 9/2014 | Saberi et al. |
| 8,931,505 B2 | 1/2015 | Hyland et al. |
| 9,053,519 B2 | 6/2015 | Scolnicov et al. |
| 9,291,520 B2 | 3/2016 | Fleury, Jr. et al. |
| 9,315,973 B2 | 4/2016 | Varman et al. |
| 9,496,943 B2 | 11/2016 | Parish et al. |
| 9,528,903 B2 | 12/2016 | Zusman |
| 9,562,623 B2 | 2/2017 | Clark |
| 9,593,999 B2 | 3/2017 | Fleury |
| 9,772,250 B2 | 9/2017 | Richarz et al. |
| 9,780,433 B2 | 10/2017 | Schwengler et al. |
| 9,799,204 B2 | 10/2017 | Hyland et al. |
| 9,849,322 B2 | 12/2017 | Hyland et al. |
| 9,861,848 B2 | 1/2018 | Hyland et al. |
| 9,970,805 B2 | 5/2018 | Cole et al. |
| 10,175,135 B2 | 1/2019 | Dintakurt et al. |
| 10,283,857 B2 | 5/2019 | Ortiz et al. |
| 10,305,178 B2 | 5/2019 | Gibson et al. |
| 10,317,384 B2 | 6/2019 | Morrow et al. |
| 10,386,257 B2 | 8/2019 | Fleury, Jr. et al. |
| 10,857,403 B2 | 12/2020 | Hyland et al. |
| 10,859,462 B2 | 12/2020 | Gibson et al. |
| 10,881,888 B2 | 1/2021 | Hyland et al. |
| 11,047,761 B1 | 6/2021 | Frackelton et al. |
| 11,067,464 B2 | 7/2021 | Moreno et al. |
| 2001/0045129 A1 | 11/2001 | Williams et al. |
| 2002/0043549 A1 | 4/2002 | Taylor et al. |
| 2002/0124633 A1 | 9/2002 | Yang |
| 2002/0159584 A1 | 10/2002 | Sindalovsky et al. |
| 2003/0107485 A1 | 6/2003 | Zoratti |
| 2003/0150488 A1 | 8/2003 | Fleury, Jr. et al. |
| 2003/0193193 A1 | 10/2003 | Harrington et al. |
| 2004/0129312 A1 | 7/2004 | Cuzzo et al. |
| 2004/0173006 A1 | 9/2004 | McCoy et al. |
| 2004/0187922 A1 | 9/2004 | Fleury, Jr. et al. |
| 2004/0201215 A1 | 10/2004 | Steingass |
| 2005/0005680 A1 | 1/2005 | Anderson |
| 2005/0067022 A1 | 3/2005 | Istre |
| 2005/0072214 A1 | 4/2005 | Cooper |
| 2005/0121880 A1 | 6/2005 | Santangelo |
| 2005/0153586 A1 | 7/2005 | Girinon |
| 2005/0279169 A1 | 12/2005 | Lander |
| 2006/0174707 A1 | 8/2006 | Zhang |
| 2006/0201550 A1 | 9/2006 | Blyth et al. |
| 2006/0283251 A1 | 12/2006 | Hunaidi |
| 2006/0284784 A1 | 12/2006 | Smith |
| 2007/0044552 A1 | 3/2007 | Huang |
| 2007/0051187 A1 | 3/2007 | McDearmon |
| 2007/0113618 A1 | 5/2007 | Yokoi et al. |
| 2007/0130317 A1 | 6/2007 | Lander |
| 2007/0295406 A1 | 12/2007 | German et al. |
| 2008/0078567 A1 | 4/2008 | Miller et al. |
| 2008/0079640 A1 | 4/2008 | Yang |
| 2008/0168840 A1 | 7/2008 | Seeley et al. |
| 2008/0189056 A1 | 8/2008 | Heidl et al. |
| 2008/0238711 A1 | 10/2008 | Payne et al. |
| 2008/0281534 A1 | 11/2008 | Hurley |
| 2008/0307623 A1 | 12/2008 | Furukawa |
| 2008/0314122 A1 | 12/2008 | Hunaidi |
| 2009/0044628 A1 | 2/2009 | Lotscher |
| 2009/0133887 A1 | 5/2009 | Garcia |
| 2009/0139336 A1 | 6/2009 | Trowbridge, Jr. et al. |
| 2009/0182099 A1 | 7/2009 | Noro et al. |
| 2009/0214941 A1 | 8/2009 | Buck et al. |
| 2009/0278293 A1 | 11/2009 | Yoshinaka et al. |
| 2009/0301571 A1 | 12/2009 | Ruhs |
| 2010/0077234 A1 | 3/2010 | Das |
| 2010/0156632 A1 | 6/2010 | Hyland et al. |
| 2010/0259461 A1 | 10/2010 | Eisenbeis et al. |
| 2010/0290201 A1 | 11/2010 | Takeuchi et al. |
| 2010/0295672 A1 | 11/2010 | Hyland |
| 2011/0063172 A1 | 3/2011 | Podduturi |
| 2011/0066297 A1 | 3/2011 | Saberi |
| 2011/0079402 A1 | 4/2011 | Darby et al. |
| 2011/0102281 A1 | 5/2011 | Su |
| 2011/0162463 A1 | 7/2011 | Allen |
| 2011/0308638 A1 | 12/2011 | Hyland |
| 2012/0007743 A1 | 1/2012 | Solomon |
| 2012/0007744 A1 | 1/2012 | Pal et al. |
| 2012/0169560 A1 | 7/2012 | Lee et al. |
| 2012/0296580 A1 | 11/2012 | Barkay |
| 2012/0324985 A1 | 12/2012 | Gu et al. |
| 2013/0036796 A1 | 2/2013 | Fleury |
| 2013/0041601 A1 | 2/2013 | Dintakurti et al. |
| 2013/0049968 A1 | 2/2013 | Fleury, Jr. |

(56) References Cited

U.S. PATENT DOCUMENTS

| | | |
|---|---|---|
| 2013/0145826 A1 | 6/2013 | Richarz et al. |
| 2013/0211797 A1 | 8/2013 | Scolnicov |
| 2013/0229262 A1 | 9/2013 | Bellows |
| 2013/0298664 A1 | 11/2013 | Gillette, II et al. |
| 2013/0321231 A1 | 12/2013 | Flores-Cuadras |
| 2014/0206210 A1 | 7/2014 | Ritner |
| 2014/0225787 A1 | 8/2014 | Ramachandran et al. |
| 2014/0373941 A1 | 12/2014 | Varman et al. |
| 2015/0070221 A1 | 3/2015 | Schwengler et al. |
| 2015/0082868 A1 | 3/2015 | Hyland |
| 2015/0128714 A1 | 5/2015 | Moss |
| 2016/0001114 A1 | 1/2016 | Hyland |
| 2016/0013565 A1 | 1/2016 | Ortiz |
| 2016/0018283 A1 | 1/2016 | Fleury |
| 2016/0097696 A1* | 4/2016 | Zusman ............... F17D 5/06 73/1.86 |
| 2017/0072238 A1 | 3/2017 | Silvers et al. |
| 2017/0121949 A1 | 5/2017 | Fleury |
| 2017/0237158 A1* | 8/2017 | Gibson ............... H01Q 1/42 343/872 |
| 2017/0237165 A1 | 8/2017 | Ortiz et al. |
| 2018/0080849 A1 | 3/2018 | Showcatally et al. |
| 2018/0093117 A1 | 4/2018 | Hyland |
| 2018/0224349 A1 | 8/2018 | Fleury, Jr. et al. |
| 2019/0024352 A1 | 1/2019 | Ozburn |
| 2019/0214717 A1 | 7/2019 | Gibson et al. |
| 2019/0214718 A1 | 7/2019 | Ortiz et al. |
| 2019/0316983 A1 | 10/2019 | Fleury, Jr. et al. |
| 2020/0069987 A1 | 3/2020 | Hyland et al. |
| 2020/0072697 A1 | 3/2020 | Gibson et al. |
| 2020/0212549 A1 | 7/2020 | Gibson et al. |
| 2020/0232863 A1 | 7/2020 | Moreno et al. |
| 2020/0232864 A1 | 7/2020 | Moreno et al. |
| 2021/0023408 A1 | 1/2021 | Hyland et al. |
| 2021/0041323 A1 | 2/2021 | Gibson et al. |
| 2021/0247261 A1 | 8/2021 | Gibson et al. |
| 2021/0249765 A1 | 8/2021 | Ortiz et al. |
| 2021/0355661 A1 | 11/2021 | Gibson et al. |
| 2022/0082467 A1 | 3/2022 | Fleury, Jr. et al. |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CA | C3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CN | 1831478 | 6/2013 |
| DE | 1211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3293315 | 3/2018 |
| FR | 2439990 | 5/1980 |
| GB | 2250820 | 6/1992 |
| GB | 2269900 | 2/1994 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 08250777 | 9/1996 |
| JP | H10-2744 | 1/1998 |
| JP | 11201859 | 7/1999 |
| JP | H11210028 | 8/1999 |
| JP | 2000131179 | 5/2000 |
| JP | 2002206965 | 7/2002 |
| JP | 2002310840 | 10/2002 |
| JP | 3595856 | 12/2004 |
| JP | 2005315663 | 11/2005 |
| JP | 2005321935 | 11/2005 |
| JP | 2006062414 | 3/2006 |
| JP | 2006062716 | 3/2006 |
| JP | 2007047139 | 2/2007 |
| JP | 2010068017 | 3/2010 |
| JP | 2013528732 | 7/2013 |
| JP | H5654124 | 11/2017 |
| KR | 101785664 | 11/2017 |
| WO | 9850771 | 11/1998 |
| WO | 0151904 | 7/2001 |
| WO | 03049528 | 6/2003 |
| WO | 2004073115 | 8/2004 |
| WO | 2008047159 | 4/2008 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2017139029 | 8/2017 |
| WO | 2017139030 | 8/2017 |
| WO | 2020050946 | 3/2020 |
| WO | 2021231163 | 11/2021 |

OTHER PUBLICATIONS

ABT, Inc., Installation Instructions Belleville Washer springs (Year: 2014).*

QRFS, Storz FDCs and fire Hydrant Storz connections: Adapters or integral Storz, Mar. 2019 (Year: 2019).*

Fleury, Jr., Leo W.; Non-Final Office Action for U.S. Appl. No. 15/939,942, filed Mar. 29, 2018, dated Mar. 24, 2021, 32 pgs.

Gibson, Daryl Lee; Final Office Action for U.S. Appl. No. 16/352,045, filed Mar. 13, 2019, dated May 4, 2021, 33 pgs.

Hyland, Gregory E., Non-Final Office Action for U.S. Appl. No. 13/101,235, filed May 5, 2011, dated Jul. 31, 2013; 57 pgs.

Hyland, Gregory E.; Final Office Action for U.S. Appl. No. 13/101,235, filed May 5, 2011, dated Feb. 20, 2014; 29 pgs.

Hyland, Gregory E.; Issue Notification for U.S. Appl. No. 13/101,235, filed May 5, 2011, dated Dec. 23, 2014, 1 pg.

Hyland, Gregory E.; Non-Final Office Action for U.S. Appl. No. 13/101,235, filed May 5, 2011, dated Jun. 5, 2014, 29 pgs.

Hyland, Gregory E.; Notice of Allowance for U.S. Appl. No. 13/101,235, filed May 5, 2011, dated Sep. 11, 2014, 11 pgs.

Hyland, Gregory E.; Supplemental Notice of Allowability for U.S. Appl. No. 13/101,235, filed May 5, 2011, dated Nov. 25, 2014, 5 pgs.

Hyland, Gregory E.; Final Office Action for U.S. Appl. No. 14/557,754, filed Dec. 2, 2014, dated Jun. 30, 2016, 24 pgs.

Hyland, Gregory E.; Non-Final Office Action for U.S. Appl. No. 14/557,754, filed Dec. 2, 2014, dated Jan. 19, 2016, 101 pgs.

Hyland, Gregory E.; Notice of Allowance for U.S. Appl. No. 14/557,754, filed Dec. 2, 2014, dated Jul. 17, 2017, 14 pgs.

Hyland, Gregory E.; Notice of Decision from Post-Prosecution Pilot Program (P3) Conference for U.S. Appl. No. 14/557,754, filed Dec. 2, 2014, dated Sep. 14, 2016, 4 pgs.

Hyland, Gregory E.; Supplemental Notice of Allowability for U.S. Appl. No. 14/557,754, filed Dec. 2, 2014, dated Oct. 20, 2017, 11 pgs.

Hyland, Gregory; Issue Notification for U.S. Appl. No. 14/557,754, filed Dec. 2, 2014, dated Dec. 20, 2017, 1 pg.

Hyland, Gregory E.; Applicant-Initiated Interview Summary for U.S. Appl. No. 14/557,754, filed Dec. 2, 2014, dated Apr. 19, 2017, 4 pgs.

Hyland, Gregory E.; Non-Final Office Action for U.S. Appl. No. 14/557,754, filed Dec. 2, 2014, dated Nov. 8, 2016, 48 pgs.

(56) References Cited

OTHER PUBLICATIONS

Hyland, Gregory E.; Final Office Action for U.S. Appl. No. 14/557,754, filed Dec. 2, 2014, dated Apr. 5, 2017 23 pgs.
Hyland, Gregory E.; Non-Final Office Action for U.S. Appl. No. 14/848,676, filed Sep. 9, 2015, dated Dec. 13, 2016, 52 pgs.
Hyland, Gregory E.; Notice of Allowance for U.S. Appl. No. 14/848,676, filed Sep. 9, 2015, dated Sep. 6, 2017, 12 pgs.
Hyland, Gregory E.; Supplemental Notice of Allowability for U.S. Appl. No. 14/848,676, filed Sep. 9, 2015, dated Nov. 27, 2017, 6 pgs.
Hyland, Gregory E.; Supplemental Notice of Allowability for U.S. Appl. No. 14/848,676, filed Sep. 9, 2015, dated Sep. 19, 2017, 8 pgs.
Hyland, Gregory; Final Office Action for U.S. Appl. No. 14/848,676, filed Sep. 9, 2015, dated Jun. 7, 2017, 25 pgs.
Hyland, Gregory; Non-Final Office Action for U.S. Appl. No. 14/848,676, filed Sep. 9, 2015, dated Mar. 4, 2016, 94 pgs.
Hyland, Gregory E.; Final Office Action for U.S. Appl. No. 14/848,676, filed Sep. 9, 2015, dated Aug. 19, 2016; 20 pgs.
Fleury Jr., Leo W.; Non-Final Office Action for U.S. Appl. No. 13/492,790, filed Jun. 8, 2012, dated Nov. 5, 2014, 30 pgs.
Fleury, Jr., Leo W.; Advisory Action for U.S. Appl. No. 13/492,790, filed Jun. 8, 2012, dated Jul. 9, 2014, 3 pgs.
Fleury, Jr., Leo W.; Final Office Action for U.S. Appl. No. 13/492,790, filed Jun. 8, 2012, dated Mar. 12, 2014; 19 pgs.
Fleury, Jr., Leo W.; Issue Notification for U.S. Appl. No. 13/492,790, filed Jun. 8, 2012, dated Mar. 2, 2016, 1 pg.
Fleury, Jr., Leo W.; Non-Final Office Action for U.S. Appl. No. 13/492,790, filed Jun. 8, 2012, dated Sep. 12, 2013; 37 pgs.
Fleury, Jr., Leo W.; Notice of Allowance for U.S. Appl. No. 13/492,790, filed Jun. 8, 2012, dated Feb. 2, 2016, 9 pgs.
Fleury, Jr., Leo W.; Notice of Allowance for U.S. Appl. No. 13/492,790, filed Jun. 8, 2012, dated May 12, 2015, 9 pgs.
Fleury, Jr., Leo W.; Notice of Allowance for U.S. Appl. No. 13/492,790, filed Jun. 8, 2012, dated Sep. 23, 2015, 11 pgs.
Fleury, Leo W.; Applicant-Initiated Interview Summary for U.S. Appl. No. 14/870,070, filed Sep. 30, 2015, dated Feb. 28, 2018, 4 pgs.
Fleury, Leo W.; Final Office Action for U.S. Appl. No. 14/870,070, filed Sep. 30, 2015, dated Dec. 29, 2017, 24 pgs.
Fleury, Leo; Non-Final Office Action for U.S. Appl. No. 14/870,070, filed Sep. 30, 2015, dated Jun. 21, 2017, 88 pgs.
Richarz, Werner Guenther; Corrected Notice of Allowability for U.S. Appl. No. 13/492,792, filed Jun. 8, 2012, dated Aug. 29, 2017, 6 pgs.
Richarz, Werner Guenther; Final Office Action for U.S. Appl. No. 13/492,792, filed Jun. 8, 2012, dated Oct. 20, 2014, 17 pgs.
Richarz, Werner Guenther; Final Office Action for U.S. Appl. No. 13/492,792, filed Jun. 8, 2012, dated Sep. 10, 2015, 20 pgs.
Richarz, Werner Guenther; Final Office Action for U.S. Appl. No. 13/492,792, filed Jun. 8, 2012, dated Sep. 8, 2016, 36 pgs.
Richarz, Werner Guenther; Issue Notification for U.S. Appl. No. 13/492,792, filed Jun. 8, 2012, dated Sep. 6, 2017, 1 pg.
Richarz, Werner Guenther; Non-Final Office Action for U.S. Appl. No. 13/492,792, filed Jun. 8, 2012, dated Nov. 6, 2013, 39 pgs.
Richarz, Werner Guenther; Non-Final Office Action for U.S. Appl. No. 13/492,792, filed Jun. 8, 2012, dated Jun. 4, 2014, 24 pgs.
Richarz, Werner Guenther; Non-Final Office Action for U.S. Appl. No. 13/492,792, filed Jun. 8, 2012, dated Feb. 27, 2015, 15 pgs.
Richarz, Werner Guenther; Notice of Allowance for U.S. Appl. No. 13/492,792, filed Jun. 8, 2012, dated Jun. 13, 2017, 31 pgs.
Richarz, Werner Guenther; Restriction Requirement for U.S. Appl. No. 13/492,792, filed Jun. 8, 2012, dated Sep. 27, 2013; 5 pgs.
Richarz, Werner Guenther; Non-Final Office Action for U.S. Appl. No. 13/492,792, filed Jun. 8, 2012, dated Mar. 8, 2016, 27 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Final Office Action for U.S. Appl. No. 13/492,794, filed Jun. 8, 2012, dated Oct. 18, 2017, 38 pgs.
Dintakurti, Ganapathi Deva Varma; Final Office Action for U.S. Appl. No. 13/492,794, filed Jun. 8, 2012, dated Nov. 8, 2016, 31 pgs.
Dintakurti, Ganapathi Deva Varma; Final Office Action for U.S. Appl. No. 13/492,794, filed Jun. 8, 2012, dated Jun. 22, 2018, 39 pgs.
Dintakurti, Ganapathi Deva Varma; Non-Final Office Action for U.S. Appl. No. 13/492,794, filed Jun. 8, 2012, dated Mar. 16, 2017, 30 pgs.
Dintakurti, Ganapathi Deva Varma; Non-Final Office Action for U.S. Appl. No. 13/492,794, filed Jun. 8, 2012, dated May 17, 2016, 48 pgs.
Fleury, Jr., Leo W.; Non-Final Office Action for U.S. Appl. No. 15/939,942, filed Mar. 29, 2018, dated Sep. 25, 2019, 92 pgs.
Hyland, Gregory E.; Office Action for Canadian patent application No. 2,766,850, filed May 5, 2011, dated Jun. 19, 2019, 4 pgs.
Ortiz, Jorge Isaac; Extended European Search Report for serial No. 16890114.8, filed Dec. 20, 2016, dated Sep. 26, 2019, 11 pgs.
Hyland, Gregory E.; Supplemental Notice of Allowance for U.S. Appl. No. 15/817,172, filed Nov. 18, 2017, dated Oct. 28, 2020, 4 pgs.
Hyland, Gregory; Supplemental Notice of Allowance for U.S. Appl. No. 15/817,172, filed Nov. 18, 2017, dated Oct. 9, 2020, 4 pgs.
Hyland, Gregory E ; Notice of Allowance for U.S. Appl. No. 16/675,507, filed Nov. 6, 2019, dated Oct. 23, 2020, 16 pgs.
Hyland, Gregory E.; Supplemental Notice of Allowance for U.S. Appl. No. 16/675,507, filed Nov. 6, 2019, dated Nov. 10, 2020, 4 pgs.
Keefe, Robert Paul, Office Action for Canadian application No. 3,060,512, filed May 5, 2011, dated Jul. 13, 2020, 6 pgs.
Gibson, Daryl Lee; Corrected Notice of Allowance for U.S. Appl. No. 16/121,136, filed Sep. 4, 2018, dated Nov. 9, 2020, 6 pgs.
Gibson, Daryl Lee; Notice of Allowance for U.S. Appl. No. 16/121,136, filed Sep. 4, 2018, dated Sep. 29, 2020, 15 pgs.
Gibson, Daryl Lee; Office Action for Canadian patent application No. 3,057,224, filed Oct. 1, 2019, dated Nov. 10, 2020, 4 pgs.
Gibson, Daryl Lee; Office Action for Canadian application No. 3,057,202, filed Oct. 1, 2019, dated Aug. 31, 2020, 4 pgs.
Hyland, Gregory E.; Supplemental Notice of Allowance for U.S. Appl. No. 15/817,172, filed Nov. 18, 2017, dated Dec. 7, 2020, 4 pgs.
Fleury, Jr., Leo W.; Final Office Action for U.S. Appl. No. 15/939,942, filed Mar. 29, 2018, dated Nov. 25, 2020, 37 pgs.
Gibson, Daryl Lee; Non-Final Office Action for U.S. Appl. No. 16/352,045, filed Mar. 13, 2019, dated Nov. 25, 2020, 106 pgs.
Gibson, Daryl Lee; Office Action for Canadian patent application No. 3,010,345, filed Dec. 20, 2016, dated Oct. 6, 2020, 4 pgs.
Hyland, Gregory E.; Non-Final Office Action for U.S. Appl. No. 16/675,507, filed Nov. 6, 2019, dated Jan. 28, 2020, 18 pgs.
Hyland, Gregory E.; Office Action for Canadian patent application No. 3,023,529, filed May 5, 2011, dated Nov. 26, 2019, 4 pgs.
Fleury, Leo W.; Office Action for Canadian patent application No. 2,842,042, filed Aug. 10, 2012, dated 12/5/82019, 3 pgs.
Ortiz, Jorge Isaac; Office Action for Canadian patent application No. 3,010,333, filed Dec. 20, 2016, dated Dec. 6, 2019, 4 pgs.
Gibson, Daryl Lee; Office Action for Canadian patent application No. 3,010,345, filed Dec. 20, 2016, dated Dec. 16, 2019, 4 pgs.
Gibson, Daryl Lee; International Search Report and Written Opinion for PCT Application No. PCT/US19/45451, filed Aug. 7, 2019, dated Feb. 3, 2020, 11 pgs.
Gibson, Daryl Lee; Office Action for Canadian application No. 3,057,202, filed Oct. 1, 2019, dated Dec. 19, 2019, 3 pgs.
Fleury, Jr., Leo W.; Final Office Action for U.S. Appl. No. 15/939,942, filed Mar. 29, 2018, dated Feb. 19, 2020, 29 pgs.
Oritz, Jorge Isaac; Office Action for Canadian patent application No. 3,070,690, filed Dec. 20, 2016, dated Mar. 10, 2020, 3 pgs.
Gibson, Daryl Lee; Extended European Search Report for 16890115.5, filed Dec. 20, 2016, dated Jan. 24, 2020, 10 pgs.
Antenna. Merriam-Webster Dictionary, 2014 [retrieved on Jun. 1, 2014], Retrieved from the Internet <URL: www.merriam-webster.com/dictionary/antenna>.

(56) References Cited

OTHER PUBLICATIONS

Dintakurti, Ganapathi Deva Varma; Non-Final Office Action for U.S. Appl. No. 13/492,794, filed May 8, 2012, dated Jan. 16, 2015, 60 pgs.
Dintakurti, Ganapathi Deva Varma; Non-Final Office Action for U.S. Appl. No. 13/492,794, filed May 8, 2012, dated Jan. 11, 2018, 38 pgs.
Dintakurti, Ganapathi Deva Varma; Notice of Allowance for U.S. Appl. No. 13/492,794, filed Jun. 8, 2012 dated Sep. 24, 2018, 21 pgs.
Dintakurti, Ganapathi Deva Varma; Corrected Notice of Allowance for U.S. Appl. No. 13/492,794, filed Jun. 8, 2012, dated Dec. 6, 2018, 6 pgs.
Dintakurti, Ganapathi Deva Varma; Issue Notification for U.S. Appl. No. 13/492,794, filed Jun. 8, 2012, dated Dec. 19, 2018, 1 pg.
Fleury Jr, Leo W.; Non-Final Office Action for U.S. Appl. No. 13/492,795, filed Jun. 8, 2012, dated Sep. 23, 2013; 35 pgs.
Fleury, Jr., Leo W.; Final Office Action for U.S. Appl. No. 13/492,795, filed Jun. 8, 2012, dated Apr. 23, 2014, 19 pgs.
Fleury, Jr., Leo W.; Advisory Action for U.S. Appl. No. 13/492,795, filed Jun. 8, 2012, dated Jun. 18, 2014, 4 pgs.
Fleury, Jr., Leo W.; Non-Final Office Action for U.S. Appl. No. 13/492,795, filed Jun. 8, 2012, dated Oct. 21, 2014, 37 pgs.
Fleury, Jr., Leo W.; Final Office Action for U.S. Appl. No. 13/492,795, filed Jun. 8, 2012, dated May 22, 2015, 28 pgs.
Non-Patent Literature "Radiodetection Water Leak Detection Products", 2008, Radiodetection Ltd.—SPX Corporation, 12 pgs.
Fleury, Jr., Leo W.; Advisory Action for U.S. Appl. No. 13/492,795, filed Jun. 8, 2012, dated Sep. 9, 2015, 3 pgs.
Fleury, Jr., Leo W.; Non-Final Office Action for U.S. Appl. No. 13/492,795, filed Jun. 8, 2012, dated Mar. 1, 2016, 42 pgs.
Fleury, Jr., Leo W.; Notice of Allowance for U.S. Appl. No. 13/492,795, filed Jun. 8, 2012, dated Sep. 21, 2016, 18 pgs.
Fleury, Jr., Leo W.; Notice of Allowability for U.S. Appl. No. 13/492,795, filed Jun. 8, 2012, dated Oct. 24, 2016, 13 pgs.
Fleury, Jr., Leo W.; Supplemental Notice of Allowance for U.S. Appl. No. 13/492,795, filed Jun. 8, 2012, dated Nov. 22, 2016; 8 pgs.
Fleury, Jr., Leo W.; Corrected Notice of Allowability for U.S. Appl. No. 13/492,795, filed Jun. 8, 2012, dated Feb. 14, 2017; 8 pgs.
Fleury, Jr., Leo W.; Issue Notification for U.S. Appl. No. 13/492,795, filed Jun. 8, 2012, dated Feb. 22, 2017; 1 page.
Fleury, Jr., Leo W.; Notice of Allowance for U.S. Appl. No. 15/401,457, filed Jan. 9, 2017, dated Apr. 16, 2019, 88 pgs.
Hyland; International Search Report and Written Opinion for serial No. PCT/US2011/035374, filed May 5, 2011, dated Sep. 13, 2011; 7 pgs.
Hyland; International Preliminary Report on Patentability for serial No. PCT/US2011/035374, filed May 5, 2011, dated Dec. 19, 2012; 5 pgs.
Hyland, Gregory E.; Office Action for Canadian Patent Application No. 2,766,850, filed May 5, 2011, dated Mar. 13, 2017, 4 pgs.
Hyland, Gregory E.; Office Action for Canadian application No. 2,766,850, filed May 5, 2011, dated Aug. 16, 2018, 4 pgs.
Hyland, Gregory E.; Mexico Office Action for serial No. MX/a/2012/000347, filed May 5, 2011, dated May 30, 2016, 4 pgs.
Hyland, Gregory E.; Mexico Office Action for serial No. MX/a/2012/000347, filed May 5, 2011, dated Aug. 31, 2016, 4 pgs.
Hyland, Gregory E.; Mexico Office Action for serial No. MX/a/2012/000347, filed May 5, 2011, dated Dec. 13, 2016, 5 pgs.
Hyland, Gregory; Extended European Search Report for serial No. 11796120.1, filed May 5, 2011, dated Nov. 4, 2016, 8 pgs.
Hyland, Gregory E.; Office Action for European patent application No. 11796120.1, filed May 5, 2011, dated Feb. 9, 2018, 4 pgs.
Hyland, Gregory E.; Australian Patent Examination Report for serial No. 2011265675, filed Jan. 21, 2012, dated Oct. 1, 2014, 3 pgs.
Hyland, Gregory E.; Japanese Office Action for serial No. 2013515338, filed Jan. 30, 2012, dated Jun. 10, 2014, 8 pgs.

Hyland, Gregory E.; Japanese Office Action for serial No. 2014-234642, filed May 5, 2011, dated Jul. 7, 2015, 9 pgs.
Hyland, Gregory E.; Japanese Office Action for serial No. 2014-234642, filed May 5, 2011, dated Nov. 4, 2015, 9 pgs.
Hyland, Gregory E.; Australian Examination Report for serial No. 2015202550, filed May 5, 2011, dated Aug. 12, 2016, 4 pgs.
Hyland, Gregory E.; Australian Examination Report for serial No. 2015202550, filed May 5, 2011, dated Feb. 9, 2017, 4 pgs.
Hyland, Gregory E.; Australian Examination Report for Serial No. 2015202550, filed May 5, 2011, dated May 16, 2017, 5 pgs.
Hyland, Gregory E.; Australian Examination Report for Serial No. 2015202550, filed May 5, 2011, dated Jul. 5, 2017, 4 pgs.
Hyland, Gregory E.; Office Action for Mexico Patent Application No. MX/a/2017/006090, filed May 5, 2011, dated Sep. 26, 2018, 4 pgs.
Hyland, Gregory E.; Examination Report for Australian patent application No. 2017248541, filed Oct. 20, 2017, dated Apr. 20, 2018, 5 pgs.
Fleury, Leo W.; International Search Report and Written Opinion for serial No. PCT/US12/50390 filed Aug. 10, 2012, dated Dec. 17, 2012, 18 pgs.
Fleury, Leo W.; International Preliminary Report on Patentability for serial No. PCT/US12/50390 filed Aug. 10, 2012, dated Feb. 18, 2014, 14 pgs.
Fleury, et al.; Supplemental European Search Report for application No. 12823594.2, filed Aug. 20, 2012, dated Feb. 18, 2015, 6 pgs.
Fleury Jr, Leo W.; European Search Report for Serial No. 12823594, filed Aug. 10, 2012, dated Jun. 8, 2015, 11 pgs.
Fleury Jr, Leo W.; European Search Report for Serial No. 12823594, filed Aug. 10, 2012, dated May 10, 2017, 4 pgs.
Fleury Jr, Leo W.; European Search Report for Serial No. 12823594, filed Aug. 10, 2012, dated Dec. 21, 2017, 4 pgs.
Fleury, Leo W.; Office Action for Canadian application No. 2,842,042, filed Aug. 10, 2012, dated Apr. 24, 2018, 3 pgs.
Hyland; U.S. Provisional Patent Application entitled: Infrastructure Monitoring Devices, Systems, and Methods, having U.S. Appl. No. 61/355,468, filed Jun. 16, 2010.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Fleury, Leo W.; Office Action for Canadian application No. 2,842,042, filed Aug. 10, 2012, dated Feb. 28, 2019, 3 pgs.
Hunaidi, Osama; Issue Notification for U.S. Appl. No. 11/766,288, filed Jun. 21, 2007, dated Sep. 22, 2010, 1 pg.
Hyland, Gregory E.; Notice of Allowance for U.S. Appl. No. 15/817,172, filed Nov. 18, 2017, dated Aug. 21, 2020, 9 pgs.
Hyland, Gregory E; Final Office Action for U.S. Appl. No. 16/675,507, filed Nov. 6, 2019, dated Jun. 26, 2020, 70 pgs.
Hunaidi, Osama; Notice of Allowance for U.S. Appl. No. 11/766,288, filed Jun. 21, 2007, dated Jun. 24, 2010, 8 pgs.
Hunaidi, Osama; Non-Final Office Action for U.S. Appl. No. 11/766,288, filed Jun. 21, 2007, dated Jan. 20, 2010, 50 pgs.
Hunaidi, Osama; Notice of Allowance for U.S. Appl. No. 09/482,317, filed Jan. 14, 2000, dated May 13, 2002, 4 pgs.
Hunaidi, Osama; Non-final Office Action for U.S. Appl. No. 09/482,317, filed Jan. 14, 2000, dated Dec. 17, 2001, 6 pgs.
Peter, Russo Anthony; European Search Report for Patent Application No. EP95307807, filed Nov. 1, 1995, dated Jul. 22, 1998, 5 pgs.
Ortiz, Jorge Isaac; Notice of Allowance for U.S. Appl. No. 15/043,057, filed Feb. 12, 2016, dated Feb. 19, 2019, 8 pgs.
Ortiz, Jorge Isaac; Final Office Action for U.S. Appl. No. 15/043,057, filed Feb. 12, 2016, dated Dec. 12, 2018, 25 pgs.
Ortiz, Jorge Isaac; Non-Final Office Action for U.S. Appl. No. 15/043,057, filed Feb. 12, 2016, dated Jun. 4, 2018, 94 pgs.
Ortiz, Jorge Isaac; International Preliminary Reporton Patentability for PCT Application No. PCT/US2016/067689, filed Dec. 20, 2016, dated Aug. 23, 2018, 8 pgs.
Ortiz, Jorge; International Search Report and Written Opinion for PCT/US16/67689, filed Dec. 20, 2016, dated Mar. 8, 2017, 9 pgs.
Gibson, Daryl Lee; Notice of Allowance for U.S. Appl. No. 15/255,795, filed Sep. 2, 2016, dated Jan. 17, 2019, 17 pgs.

(56) References Cited

OTHER PUBLICATIONS

Gibson, Daryl Lee; Final Office Action for U.S. Appl. No. 15/255,795, filed Sep. 2, 2016, dated Aug. 31, 2018, 33 pgs.
Hyland, Gregory E ; Final Office Action for U.S. Appl. No. 15/817,172, filed Nov. 18, 2017, dated Jun. 11, 2020, 33 pgs.
Fleury, Jr., Leo W.; Non-Final Office Action for U.S. Appl. No. 15/939,942, filed Mar. 29, 2018, dated May 27, 2020, 23 pgs.
Gibson, Daryl Lee; Requirement for Restriction/Election for U.S. Appl. No. 16/121,136, filed Sep. 14, 2018, dated May 7, 2020, 5 pgs.
Gibson, Daryl Lee; Office Action for Canadian patent application No. 3,057,167, filed Aug. 7, 2019, dated May 25, 2020, 3 pgs.
Gibson, Daryl Lee; Office Action for Canadian application No. 3,057,202, filed Oct. 1, 2019, dated Apr. 2, 2020, 4 pgs.
Gibson, Daryl Lee; Non-Final Office Action for U.S. Appl. No. 16/121,136, filed Sep. 4, 2018, dated Jun. 22, 2020, 94 pgs.
Keefe, Robert Paul, Office Action for Canadian application No. 3,060,512, filed May 5, 2011, dated Apr. 22, 2020, 5 pgs.
Gibson, Daryl Lee; Non-Final Office Action for U.S. Appl. No. 16/234,715, filed Dec. 28, 2018, dated Jan. 1, 2021, 105 pgs.
Gibson, Daryl Lee; International Preliminary Reporton Patentability for PCT Application No. PCT/US19/45451, filed Aug. 7, 2019, dated Mar. 18, 2021, 8 pgs.
Ortiz, Jorge Isaac; Supplemental Notice of Allowance for U.S. Appl. No. 15/043,057, filed Mar. 13, 2019, 6 pgs.
Ortiz, Jorge Isaac; Issue Notification for U.S. Appl. No. 15/043,057, filed Feb. 12, 2016, dated Apr. 17, 2019, 1 pg.
Gibson, Daryl Lee; Non-Final Office Action for U.S. Appl. No. 15/255,795, filed Sep. 2, 2016, dated Feb. 23, 2018, 86 pgs.
Gibson, Daryl Lee; Corrected Notice of Allowance for U.S. Appl. No. 15/255,795, filed Sep. 2, 2016, dated Mar. 21, 2019, 6 pgs.
Spliiz, David; International Search Report and Written Opinion for serial No. PCT/US11/58260, filed Oct. 28, 2011, dated Feb. 7, 2012, 8 pgs.
Gibson, Daryl Lee; International Search Report and Written Opinion for PCT Application No. PCT/US2016/067692, filed Dec. 20, 2016, dated Mar. 2, 2017, 10 pgs.
Gibson, Daryl Lee; International Preliminary Report on Patentability for PCT Application No. PCT/US2016/067692, filed Dec. 20, 2016, dated Aug. 23, 2018, 9 pgs.
Gibson, Daryl Lee; U.S. Provisional Application entitled: Nozzle Cap Multi-Band Antenna Assembly having U.S. Appl. No. 62/294,973, filed Feb. 12, 2016, 54 pgs. .
Hyland, Gregory E.; Issue Notification for U.S. Appl. No. 14/848,676, filed Sep. 9, 2015, dated Dec. 6, 2017, 1 pg.
J .A. Gallego-Juarez, G. Rodriguez-Corral and L. Gaete-Garreton, An ultrasonic transducer for high power applications in gases, Nov. 1978, Ultrasonics, published by IPC Business Press, p. 267-271., 5 pgs.
"Non-Patent Literature Murata (entitled ""Piezoelectric Sounds Components"""), accessed at http://web.archive.org/web/20030806141815/http://www.murata.com/catalog/p37e17.pdf, archived on Aug. 6, 2003.", 39 pgs.
"Non-Patent Literature NerdKits, accessed at http://web.archive.org/web/20090510051850/http://www.nerdkits.com/videos/sound_meter/, archived on May 10, 2009 ", 6 pgs.
"Non-Patent Literature Bimorph (entitled ""Bimoprh actuators"""), accessed at http://web.archive.org/web/20080122050424/http://www.elpapiezo.ru/eng/curve_e.shtml, archived on Jan. 22, 2008", 3 pgs.
Hyland, Gregory E; Non-Final Office Action for U.S. Appl. No. 15/817,172, filed Nov. 18, 2017, dated Jul. 10, 2019, 74 pgs.
Fleury, Jr., Leo W.; Corrected Notice of Allowance for U.S. Appl. No. 15/401,457, filed Jan. 9, 2017, dated Jun. 26, 2019, 55 pgs.
Hyland, Gregory E ; Non-Final Office Action for U.S. Appl. No. 15/817,172, filed Nov. 18, 2017, dated Dec. 17, 2019, 23 pgs.
Gibson, Daryl Lee; Invitation to Pay Additional Fees for PCT/US19/45451, filed Aug. 7, 2019, dated Oct. 10, 2019, 2 pgs.
Gibson, Daryl Lee; Office Action for Canadian patent application No. 3,057,167, filed Aug. 7, 2019, dated Nov. 19, 2019, 7 pgs.
Ortiz, Jorge Isaac; Non-Final Office Action for U.S. Appl. No. 17/245,181, filed Apr. 30, 2021, dated Sep. 16, 2021, 82 pgs.
Gibson, Daryl Lee; Applicant-Initiated Interview Summary for U.S. Appl. No. 16/234,715, filed Dec. 28, 2018, dated Oct. 14, 2021, 2 pgs.
Gibson, Daryl Lee; Extended European Search Report for application No. 21180958.7, filed Aug. 7, 2019, dated Oct. 5, 2021, 8 pgs.
Gibson, Daryl Lee; International Search Report and Written Opinion for PCT Application No. PCT/US21/31033, filed May 6, 2021, dated Sep. 24, 2021, 12 pgs.
Ortiz, Jorge Isaac; Office Action for European patent application No. 16890114.8, filed Dec. 20, 2016, dated Oct. 4, 2021, 7 pgs.
Ortiz, Jorge Isaac; Non-Final Office Action for U.S. Appl. No. 16/354,939, filed Mar. 15, 2019, dated Aug. 10, 2021, 126 pgs.
Ortiz, Jorge Isaac; Requirement for Restriction/Election for U.S. Appl. No. 17/245,181, filed Apr. 30, 2021, dated Jul. 22, 2021, 6 pgs.
Gibson, Daryl Lee; Non-Final Office Action for U.S. Appl. No. 16/352,045, filed Mar. 13, 2019, dated Aug. 13, 2021, 20 pgs.
Gibson, Daryl Lee; Final Office Action for U.S. Appl. No. 16/234,715, filed Dec. 28, 2018, dated Aug. 5, 2021, 21 pgs.
Gibson, Daryl Lee; Invitation to Pay Additional Fees for PCT/US21/31033, filed May 6, 2021, dated Jul. 15, 2021, 2 pgs.
Fleury Jr., Leo W.; Final Office Action for U.S. Appl. No. 15.939,942, filed Mar. 29, 2018, dated Aug. 27, 2021, 30 pgs.
Gibson, Daryl Lee; Non-Final Office Action for U.S. Appl. No. 17/079,642, filed Oct. 26, 2020, dated Aug. 30, 2021, 84 pgs.
Gibson, Daryl Lee; Non-Final Office Action for U.S. Appl. No. 17/245,419, filed Apr. 30, 2021, dated Sep. 2, 2021, 82 pgs.
Gibson, Daryl; Office Action for U.S. Patent application No. 3,057,224, filed Oct. 1, 2019, dated Jun. 23, 2021, 4 pgs.
Fleury Jr., Leo W., Advisory Action for U.S. Appl. No. 15/939,942, filed Mar. 29, 2018, dated Dec. 7, 2021, 2 pgs.
Ortiz, Jorge Isaac; Final Office Action for U.S. Appl. No. 17/245,181, filed Apr. 30, 2021, dated Dec. 7, 2021, 28 pgs.
Ortiz, Jorge Isaac; Office Action for Canadian patent application No. 3,095,465, filed Dec. 20, 2016, dated Nov. 8, 2021, 4 pgs.
Gibson, Daryl Lee; Notice of Allowance for U.S. Appl. No. 16/352,045, filed Mar. 13, 2019, dated Dec. 1, 2021, 24 pgs.
Gibson, Daryl Lee; Notice of Allowance for U.S. Appl. No. 16/234,715, filed Dec. 28, 2018, dated Dec. 7, 2021, 23 pgs.
Gibson, Daryl Lee; Final Office Action for U.S. Appl. No. 17/079,642, filed Oct. 26, 2020, dated Dec. 14, 2021, 17 pgs.
Gibson, Daryl Lee; Applicant-Initiated Interview Summary for U.S. Appl. No. 17/245,419, filed Apr. 30, 2021, dated Dec. 2, 2021, 2 pgs.
Gibson, Daryl Lee; Final Office Action for U.S. Appl. No. 17/245,419, filed Apr. 30, 2021, dated Oct. 25, 2021, 27 pgs.
Fleury, Jr.; Non-Final Office Action for U.S. Appl. No. 16/453,318, filed Jun. 26, 2019, dated Mar. 2, 2022, 129 pgs.
Ortiz, Jorge Isaac; Final Office Action for U.S. Appl. No. 16/354,939, filed Mar. 15, 2019, dated Mar. 17, 2022, 40 pgs.
Ortiz, Jorge Isaac; Notice of Allowance for U.S. Appl. No. 17/245,181, filed Apr. 30, 2021, dated Mar. 7, 2022, 13 pgs.
Gibson, Daryl Lee; Applicant-Initiated Interview Summary for U.S. Appl. No. 17/079,642, filed Oct. 26, 2020, dated Feb. 9, 2022, 2 pgs.
Gibson, Daryl Lee; Notice of Allowance for U.S. Appl. No. 17/079,642, filed Oct. 26, 2020, dated Mar. 1, 2022, 11 pgs.
Gibson, Daryl Lee; Applicant-Initiated Interview Summary for U.S. Appl. No. 17/245,419, filed Apr. 30, 2021 dated Mar. 8, 2022, 2 pgs.
Gibson, Daryl Lee; Non-Final Office Action for U.S. Appl. No. 17/245,419, filed Apr. 30, 2021, dated Jan. 14, 2022, 27 pgs.
Gibson, Daryl Lee; Office Action for Canadian patent application No. 3,105,683, filed Aug. 7, 2019, dated Mar. 8, 2022, 4 pgs.
Hyland, Gregory E.; Non-Final Office Action for U.S. Appl. No. 17/071,632, filed Oct. 15, 2020, dated Mar. 30, 2022, 89 pgs.
Fleury, Leo W., Jr.; Office Action for Canadian patent application No. 3,102,529, filed Aug. 10, 2012, dated Mar. 16, 2022, 4 pgs.
Gibson, Daryl Lee; Final Office Action for U.S. Appl. No. 17/245,419, filed Apr. 30, 2021, dated Apr. 8, 2022, 31 pgs.

(56) References Cited

OTHER PUBLICATIONS

Gibson, Daryl Lee; Extended European Search Report for application No. 19857477.4, filed Aug. 7, 2019, dated Jan. 5, 2022, 7 pgs.

* cited by examiner

HYDRANT NOZZLE CAP

TECHNICAL FIELD

This disclosure relates to fire hydrants. More specifically, this disclosure relates to a hydrant nozzle cap for detecting leaks in a fluid system connected to a fire hydrant.

BACKGROUND

Fire hydrants are commonly connected to fluid systems, such as municipal water infrastructure systems and water mains, through stand pipes. Because these fluid systems are typically partially or entirely located underground, it can be difficult to detect leaks within the fluid systems. Additionally, it can be difficult to access these fluid systems for monitoring. Fire hydrants can provide convenient above-ground access to the fluid systems. Leaks within the fluid systems can send vibrations through the fluid system and up the stand pipes to the fire hydrants. These vibrations propagating through the stand pipes and fire hydrants can be monitored to detect leaks within the connected fluid system. However, fire hydrants can be subjected to other sources of vibration such as wind, rain, ambient noise from loud passing vehicles, or direct contact such as pedestrians bumping into fire hydrants or bicyclists leaning their bicycles against fire hydrants. These sources of background noise can trigger false alarms or make it more difficult for a potential leak to be detected.

Leak detection systems can be provided for detecting leaks in the fluid systems and can be attached to a nozzle of the fire hydrant. Often, the sensitive electronic components of the leak detection system are housed in an enclosed cavity. Pressure changes within the cavity can create stresses on structural components of the leak detection system, which can lead to damage or failure of the structural components. Additionally, moisture and other undesirable elements can enter a cavity that is not adequately sealed, and can damage the electronic components. To protect the electronic components, they often must be potted within the cavity. Furthermore, producing such leak detection systems can be expensive and time consuming. Customers who may not desire a leak detection system often need to seek out alternative solutions for capping the nozzle because of the added cost of the leak detection system. Also, customers who may desire to replace an ordinary nozzle cap with a nozzle cap comprising a leak detection system must purchase an entirely new and expensive nozzle cap.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a nozzle cap for a fire hydrant comprising a cap body, the cap body comprising an inner housing and an outer housing, the outer housing defining a cavity; a vibration sensor received within the cavity and configured to detect leaks in a fluid system connected to the fire hydrant; and a metal insert contacting the vibration sensor and the inner housing.

Also disclosed is a nozzle cap for a fire hydrant comprising a cap cover comprising a metal material; a cap body comprising: an inner housing comprising a metal material; and an outer housing comprising a non-metal material, the outer housing received between the inner housing and the cap cover, the outer housing defining a cavity; and a vibration sensor received within the cavity and configured to detect leaks in a fluid system connected to the fire hydrant.

A modular nozzle cap for a fire hydrant is also disclosed, the modular nozzle cap comprising a cap cover; a cap body comprising: an inner housing configured to engage the fire hydrant; and an outer module removably received between the inner housing and the cap cover; and a fastener for removably coupling the outer module to the cap cover and the inner housing.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
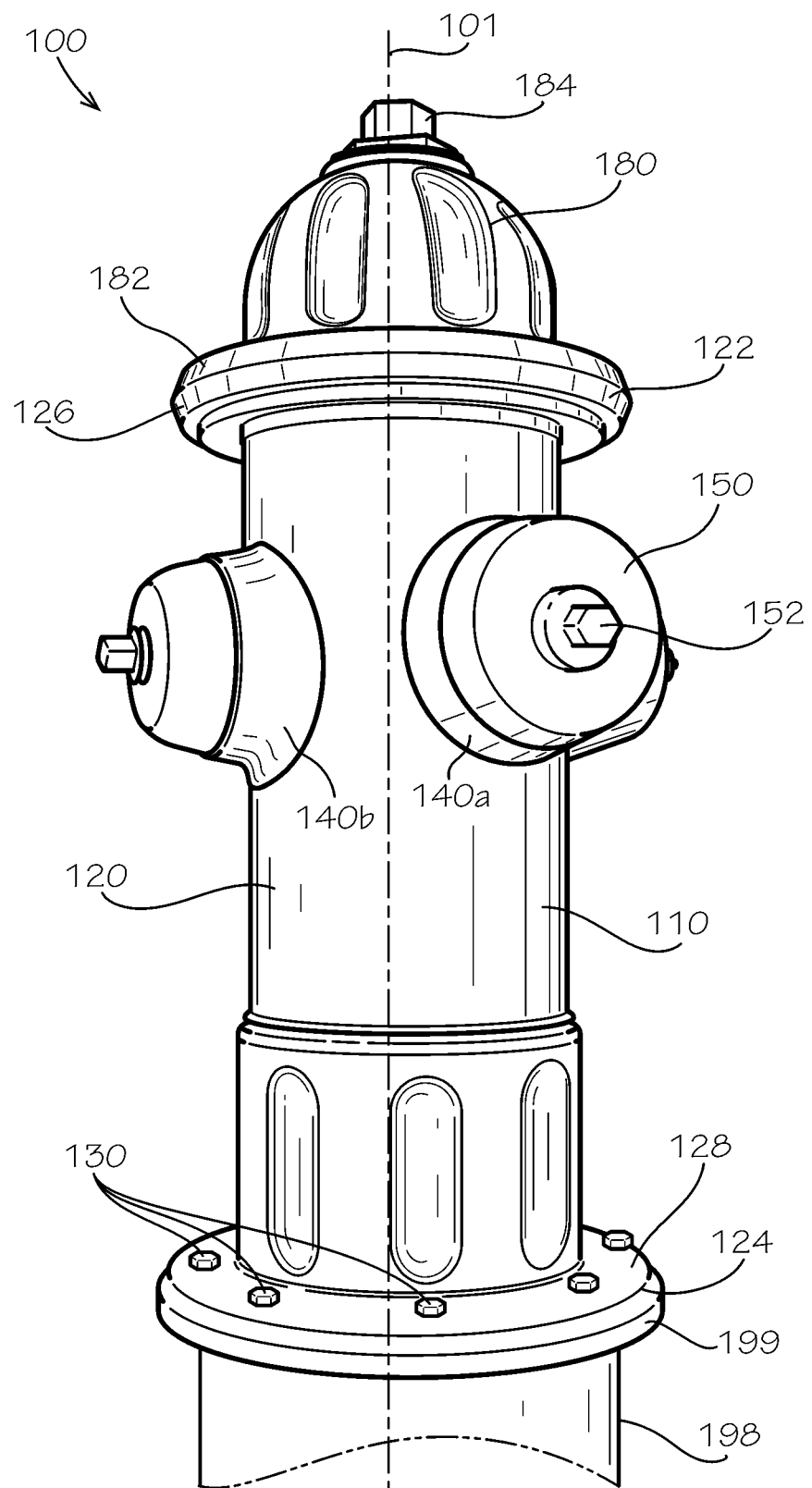
FIG. 1 is a perspective view of a hydrant assembly comprising a nozzle cap connected to a nozzle of a fire hydrant, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a hydrant assembly and associated methods, systems, devices, and various apparatus. The hydrant assembly can comprise a fire hydrant and a vibration sensor. It would be understood by one of skill in the art that the disclosed hydrant assembly is described in but a few exemplary aspects among many. No particular terminology or description should be considered limiting on the disclosure or the scope of any claims issuing therefrom.

FIG. 1 is a perspective view of a hydrant assembly 100 comprising a fire hydrant 110 and a vibration sensor 380 (shown in FIG. 3A) in accordance with one aspect of the present disclosure. The fire hydrant 110 can comprise a barrel 120, a nozzle cap 150, and a bonnet 180. The barrel 120 can define a top barrel end 122 and a bottom barrel end 124 disposed opposite from the top barrel end 122. The barrel 120 can be substantially tubular, and the barrel 120 can define a barrel axis 101 extending from the top barrel end 122 to the bottom barrel end 124. In the present aspect, the barrel axis 101 can be substantially vertically aligned wherein the barrel axis 101 is aligned with the force of gravity.

The barrel 120 can comprise a top flange 126 disposed at the top barrel end 122 and a base flange 128 disposed at the bottom barrel end 124. The base flange 128 can be fastened to a stand pipe flange 199 of a stand pipe 198 of a fluid system (not shown), such as a water main for example and without limitation. Example aspects of the stand pipe 198 can be formed from a metal material, such as, for example, iron or steel. The base flange 128 can be fastened to the stand pipe flange 199 by a plurality of fasteners 130. A bonnet flange 182 of the bonnet 180 can be attached to the top flange 126 of the barrel 120, such as with a plurality of fasteners (not shown) similar to the fasteners 130. The bonnet 180 can comprise an operation nut 184, or "op nut", which can be rotated to open and close a main valve (not shown) positioned at the bottom barrel end 124 or below in the stand pipe 198 in order to respectively supply or cut off pressurized water flow to the fire hydrant 110.

The barrel 120 can define one or more nozzles 140*a,b*. The nozzle cap 150 can be screwed onto the nozzle 140*a* to seal the nozzle 140*a*. With the nozzle cap 150 sealing the nozzle 140*a*, pressurized water cannot escape through the nozzle 140*a* when the main valve (not shown) is in an open position. The nozzle cap 150 can define a cap nut 152 which can be turned, such as with a wrench, to tighten or loosen the nozzle cap 150 on the nozzle 140*a*. In example aspects, the fire hydrant 110 can be formed from a metal material, such as iron, and as such, the nozzle 140 can be formed from a metal material. In some aspects, the nozzle 140*a* can be a Storz nozzle, as described in further detail below.

Figure 2:
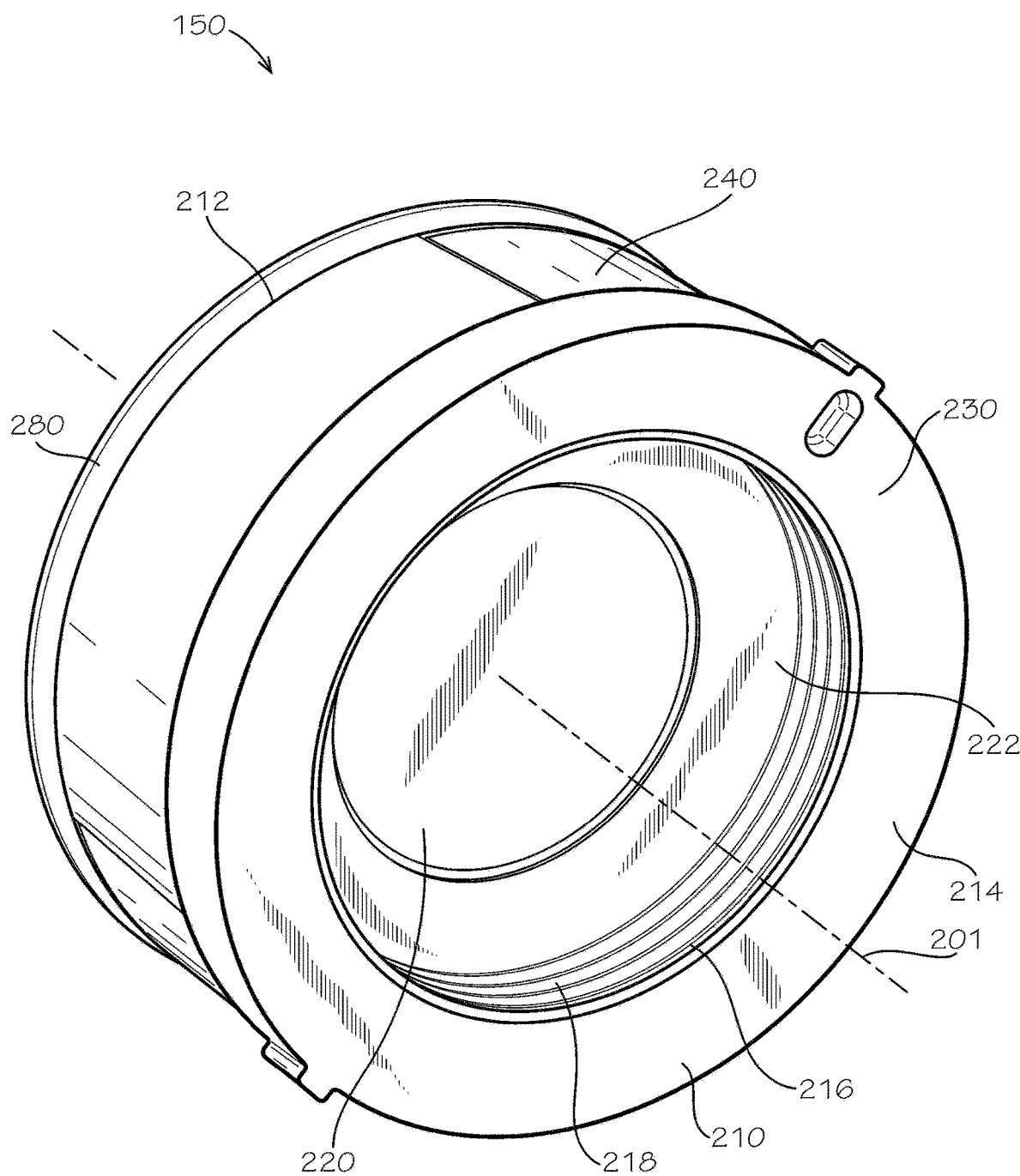
FIG. 2 is a perspective rear view of the nozzle cap of FIG. 1.

FIG. 2 is a perspective rear view of the nozzle cap 150 of the fire hydrant 110 of FIG. 1. The nozzle cap 150 can comprise a cap body 210 and a cap cover 280. Example aspects of the cap cover 280 can be formed from a metal material, such as for example, ductile iron. The cap body 210 can define a first body end 212 and a second body end 214 disposed opposite from the first body end 212. The cap body 210 can further comprise an inner housing 230 and an outer module, such as an outer housing 240. According to example aspects, the inner housing 230 can be formed from a metal material, such as, for example, ductile iron, and the outer housing 240 can be formed from a plastic material. Example aspects of the plastic material of the outer housing 240 can be a glass-filled plastic material to provide an improved acoustic performance. The cap cover 280 can be attached to the first body end 212 of the cap body 210 at the outer housing 240. The inner housing 230 of the cap body 210 can define a threaded bore 216 extending into the cap body 210 from the second body end 214 to an inner wall 220 of the cap body 210. The threaded bore 216 can define a cap axis 201 of the cap body 210, and the cap axis 201 can extend from the first body end 212 to the second body end 214. According to example aspects, the nozzle cap 150 can be a modular system wherein the outer module, such as the outer housing 240, can be easily removed and/or replaced, as desired. For example, it may be desired to remove the outer housing 240 temporarily for repair or to replace the removed outer housing 240 with a new outer housing 240 or a different outer module. The modularity of the modular nozzle cap 150 is described in further detail below with respect to FIGS. 3A, 6, and 8.

The threaded bore 216 can define internal threading 218, and the threaded bore 216 can be screwed onto the nozzle 140*a* (shown in FIG. 1), for example, a Storz nozzle, to mount the nozzle cap 150 on the nozzle 140*a* by rotating the nozzle cap 150 about the cap axis 201. In the present aspect, the internal threading 218 can be straight threading that does not taper from the second body end 214 towards the inner wall 220. In other aspects, the internal threading 218 can be tapered threading that tapers from the second body end 214 towards the inner wall 220. A gasket 222 can be positioned adjacent to the inner wall 220, and the gasket 222 can be configured to form a seal with the nozzle 140*a* (shown in FIG. 1) when the nozzle cap 150 is screwed onto the nozzle 140*a* in a sealed position. As described below with respect to FIGS. 6 and 7, the gasket 222 can be selected based on its thickness, measured axially along the cap axis 201, to alter a rotational indexing of the nozzle cap 150 relative to the nozzle 140*a*.

Figure 3A:
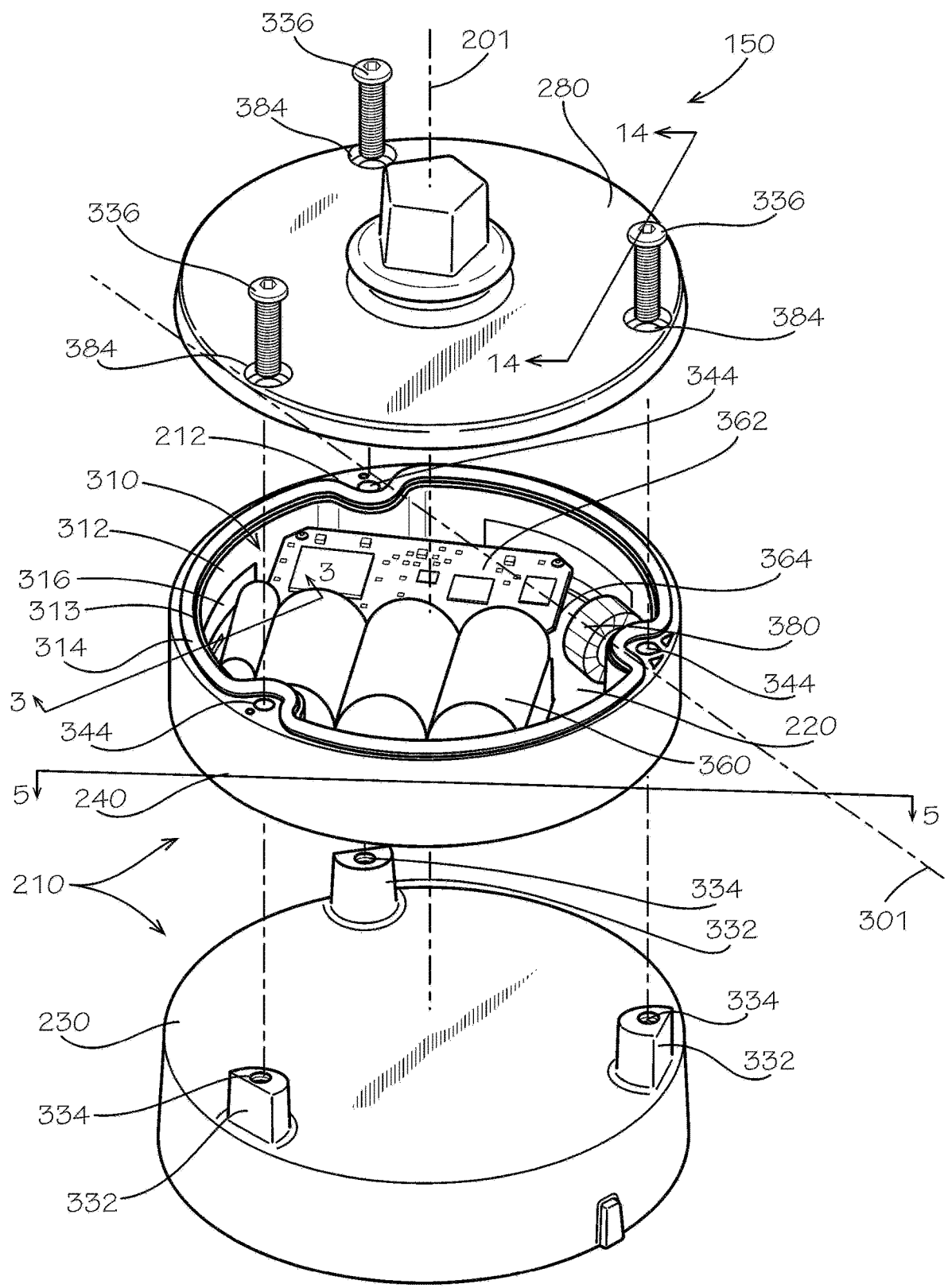
FIG. 3A is an exploded view of the nozzle cap of FIG. 1.

FIG. 3A is an exploded view of the nozzle cap 150. As shown, the outer housing 240 of the cap body 210 can define a cavity 310 extending inwards into the cap body 210 from the first body end 212 to the inner wall 220. In the present aspect, the cavity 310 can extend axially inward relative to the cap axis 201. The inner wall 220 can separate the cavity 310 from the threaded bore 216 (shown in FIG. 2). The cap body 210 can define a circumferential wall 312 which partially encloses the cavity 310 and extends circumferentially around the cavity 310 relative to the cap axis 201. A cavity opening 313 to the cavity 310 can be defined at the first body end 212, and a cavity gasket 314 can extend around the cavity opening 313. As shown, example aspects of the nozzle cap 150 can further comprise one or more of the antennas 316 installed on the circumferential wall 312 and within the cavity 310, as shown. According to example aspects, the antenna(s) 316 can be attached to the circumferential wall 312 by a fastener, such as, for example, an adhesive, such as glue, a mechanical fastener, such as a screw or clip, or any other suitable type of fastener known in the art, or combination thereof. As described above, the outer housing 240 can be formed from a plastic material, or another non-ferrous material, so that the material of the outer housing 240 does not interfere with the signaling ability of the antenna 316.

The cavity gasket 314 can be configured to form a watertight seal with the cap cover 280 to enclose and seal the cavity 310. As such, the electronic components (e.g., the sensor 380, the antenna 316, a printed circuit board 362, a battery pack 360) within the cavity 310 can be protected from undesirable external elements, such as water and dirt. Thus, the watertight seal provided by the cavity gasket 314 can eliminate the need to protect the electronic components through potting the electronic components within the cavity 310.

The inner housing 230 can comprise one or more posts 332 configured to engage a gap 522 (shown in FIG. 5B) formed between the circumferential wall 312 and an internal wall 524 (shown in FIG. 5B) of the outer housing 240 of the cap body 210. Example aspects of the posts 332 can be monolithically formed with the inner housing 230 and can be formed from the same material thereof, such as a metal material like ductile iron. Each of the posts 332 can define an inner fastener hole 334 configured to align with outer fastener holes 344 of the outer housing 240 and cap fastener holes 384 of the cap cover 280. A fastener, such as a security screw 336, can engage each of the aligned sets of fastener holes 334, 344, 384 to couple the inner housing 230, outer housing 240, and cap cover 280 together. In example aspects, as shown, the cavity gasket 314 can be configured to curve around the outer fastener holes 344, such that the cavity gasket 314 does not interfere with the security screws 336 engaging the outer fastener holes 344. Furthermore, as described above, the nozzle cap 150 can be a modular system, wherein the outer housing 240 can be easily removed and/or replaced. In the present aspect, the outer housing 240 can be removed by simply unscrewing the security screws 336 from the fastener holes 334, 344, 384 to detach the outer housing 240 from the inner housing 230 and the cap cover 280. If desired, a new outer housing 240 or another outer module, such as the mechanical spacer 810 shown in FIG. 8, can replace the removed outer housing 240.

The nozzle cap 150 can further comprise the battery pack 360 and the printed circuit board ("PCB") 362, each disposed within the cavity 310. The PCB 362 can be attached to a mounting bracket 364 which can be secured within the cavity 310 by one or more fasteners (not shown). The nozzle cap 150 can also comprise the vibration sensor 380, and the vibration sensor 380 can be disposed within the cavity 310. The vibration sensor 380 can define a sensor axis 301 which can be perpendicular to the cap axis 201. The vibration sensor 380 can be attached to the circumferential wall 312, and the vibration sensor 380 can extend generally inward from the circumferential wall 312 and into the cavity 310.

The battery pack 360, the PCB 362, the vibration sensor 380, and the antenna(s) 316 can be connected together in electrical communication. The vibration sensor 380 can be configured to detect leaks within the fluid system (not shown) by monitoring vibrations travelling up the stand pipe 198 (shown in FIG. 1) and through the fire hydrant 110 (shown in FIG. 1) when the nozzle cap 150 is mounted on the nozzle 140*a* (shown in FIG. 1). Vibration patterns within the fluid system can indicate the presence of leaks within the fluid system. The vibration sensor 380 can produce voltage readings when the vibration sensor 380 experiences vibrations. These voltage readings can be processed by the PCB 362 to determine whether leaks are present, and a signal can be transmitted outwards from the nozzle cap 150 by the antenna(s) 316 to convey whether leaks have been identified within the fluid system.

Figure 3B:
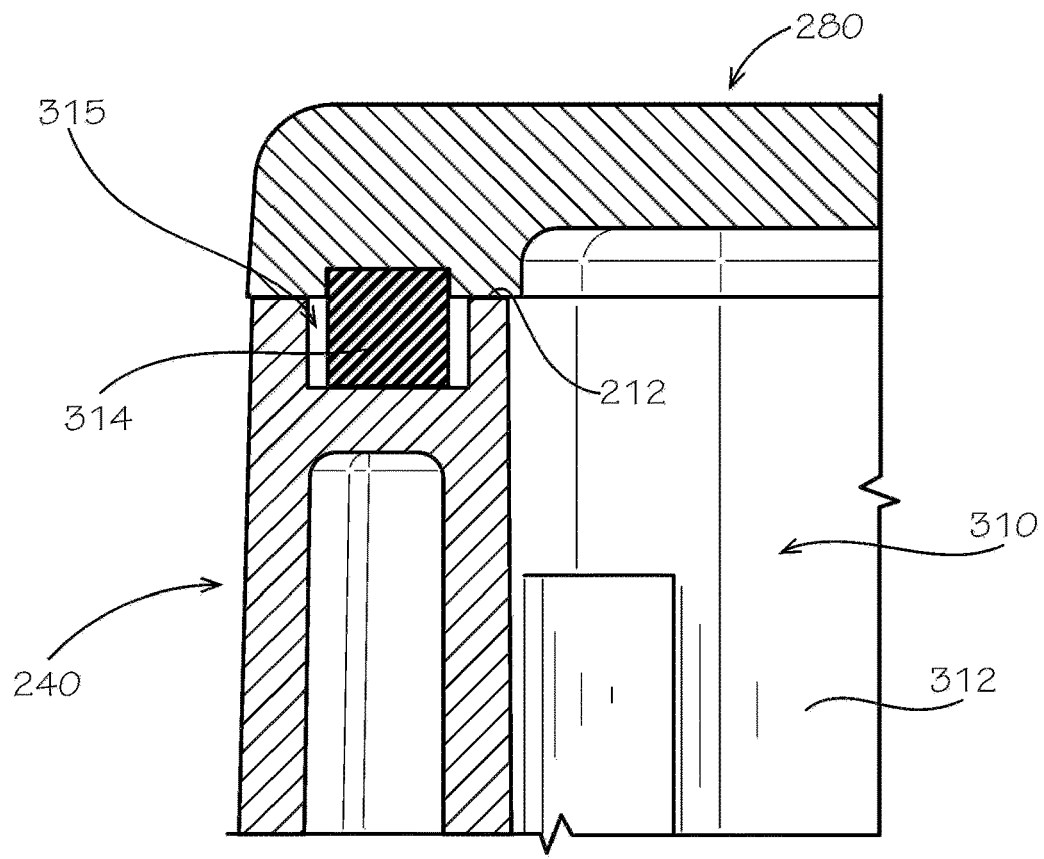
FIG. 3B is a cross-sectional detail view of the assembled nozzle cap of FIG. 1, taken along line 3-3 in FIG. 3A.

FIG. 3B is a detail cross-sectional view of the cavity gasket 314 compressed between the outer housing 240 and the cap cover 280 to form a watertight seal therebetween. As shown, in the present aspect, the cavity gasket 314 can be compressed within a channel 315 formed at the first body end 212. As described above, the cavity gasket 314 can prevent moisture and other undesirable elements from entering the cavity 310.

Figure 4:
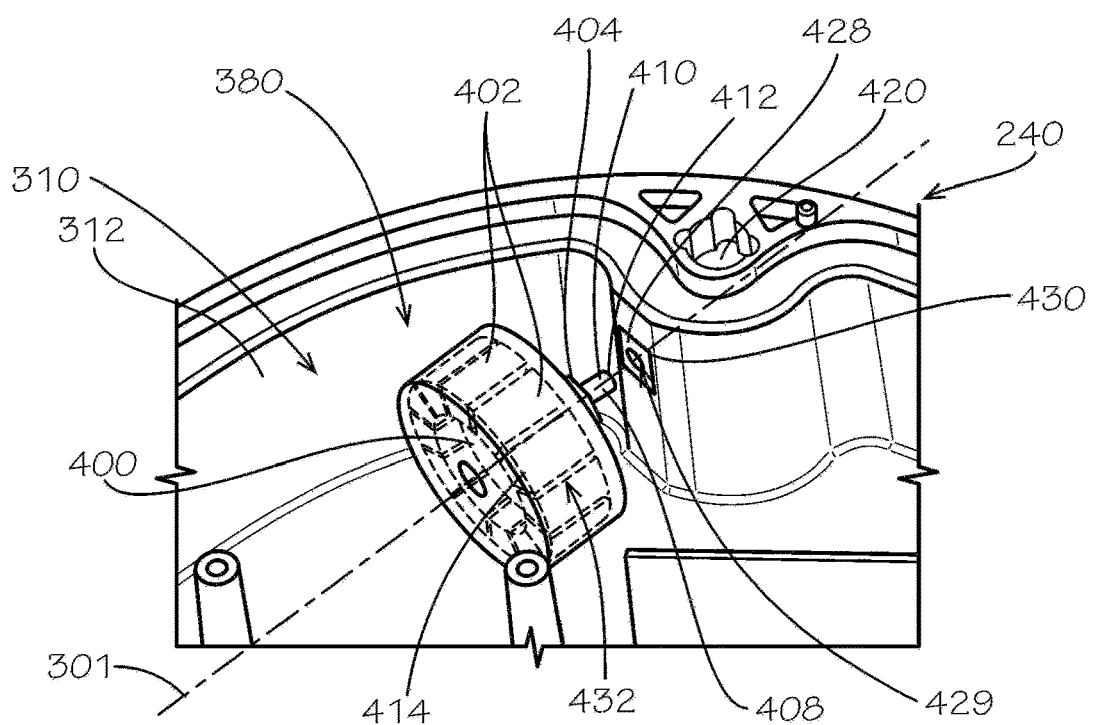
FIG. 4 is a top perspective view of an outer housing of the nozzle cap of FIG. 1, according to another aspect of the present disclosure, illustrating a vibration sensor thereof.

Referring to FIG. 4, according to example aspects, the vibration sensor 380 can be a piezoelectric vibration sensor. Piezoelectric vibration sensors are described in greater detail in U.S. patent application Ser. No. 16/121,136, filed Sep. 4, 2018 and U.S. Pat. No. 9,528,903, issued Dec. 27, 2016, which are hereby incorporated by reference in their entirety. The vibration sensor 380 can comprise a base 400, at least one piezoelectric crystal (not shown), and a plurality of calibration masses 402. The calibration masses 402 can be distributed circumferentially around the base 400. In the present aspect, the calibration masses 402 can be integrally formed with the base 400; however in other aspects, the calibration masses 402 can be separate components which can be attached to the base 400, such as with a glue, adhesive, mastic, epoxy, or another method such as welding, brazing, soldering, or any other attachment method for example and without limitation. In the present aspect, the calibration masses 402 can extend axially outward from each side of the base 400 with respect to the sensor axis 301. A notch 432 can be defined between each pair of adjacent calibration masses 402, and the calibration masses 402 can vibrate independently from one another.

In the present aspect, a fastener 408 of the vibration sensor 380 can extend through the base 400 and piezoelectric crystals and can define a threaded end 410, and a spacer 404 can be fit over the fastener 408 between the base 400 and the threaded end 410. Example aspects of the fastener 408 can be formed from a metal material. In the present aspect, the threaded end 410 can define a first sensor end 412 of the vibration sensor 380, and a second sensor end 414 can be defined by the calibration masses 402, opposite from the first sensor end 412. The sensor axis 301 can extend through the fastener 408 and the vibration sensor 380 as a whole from the first sensor end 412 to the second sensor end 414.

Referring to FIG. 4, according to example aspects, a metal insert 420 can be received outside of the cavity 310 within the gap 522 (shown in FIG. 5B) formed between the circumferential wall 312 and the internal wall 524 (shown in FIG. 5B) of the cap body 210. In some aspects, the cap body 210 can be formed from plastic and the metal insert 420 can be molded into the plastic cap body 210. By molding the metal insert into the plastic housing, a vapor tight seal can be created around the insert without the need for additional sealing techniques. The metal insert 420 can define a connector 428 extending through an opening 430 in the circumferential wall 312. In the present aspect, a threaded hole 429 can be defined in the connector 428, and the threaded end 410 of the fastener 408 can be configured to engage the threaded hole 429 to attached the vibration sensor 380 to the cap body 210 (shown in FIG. 2).

Figure 5A:
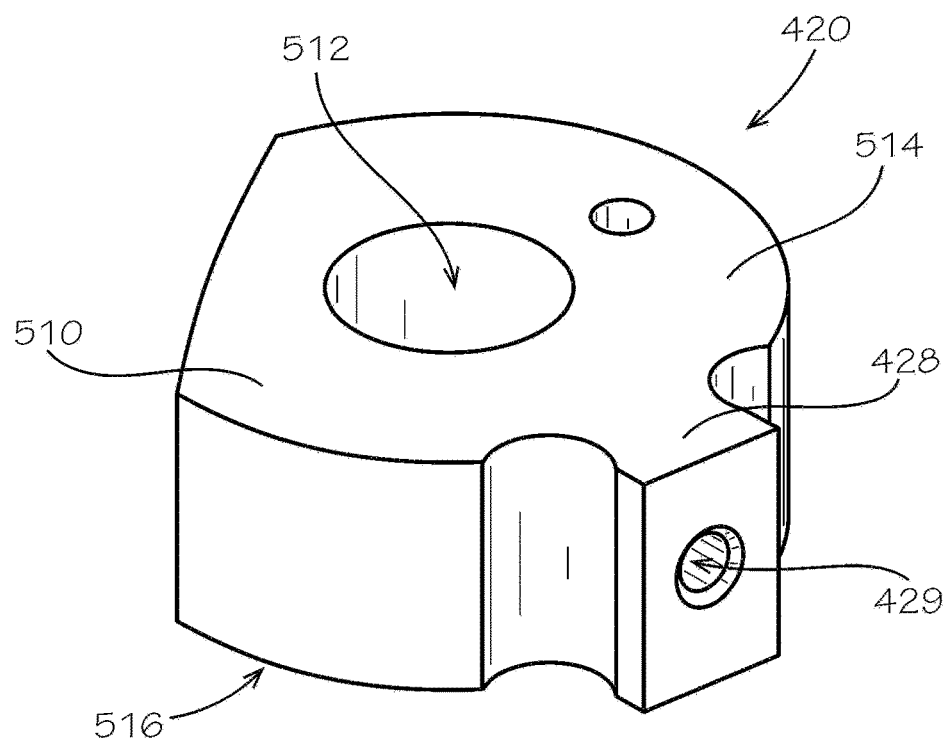
FIG. 5A is a top perspective view of a metal insert of the nozzle cap of FIG. 1.

FIG. 5A illustrates the metal insert 420 removed from the nozzle cap 150. As shown, the metal insert 420 can comprise a generally toroidal body 510, which can define an opening 512 through a center thereof. The opening 512 can be configured to allow a corresponding one of the security screws 336 to pass therethrough. The metal insert 420 can further define a top surface 514 and an opposite bottom surface 516, as shown. The connector 428 can extend from the toroidal body 510 in a direction substantially parallel to the top and bottom surfaces 514, 516. The threaded hole 429 can be formed in the connector 428 distal from the toroidal body 510 and can extend towards the toroidal body 510.

Figure 5B:
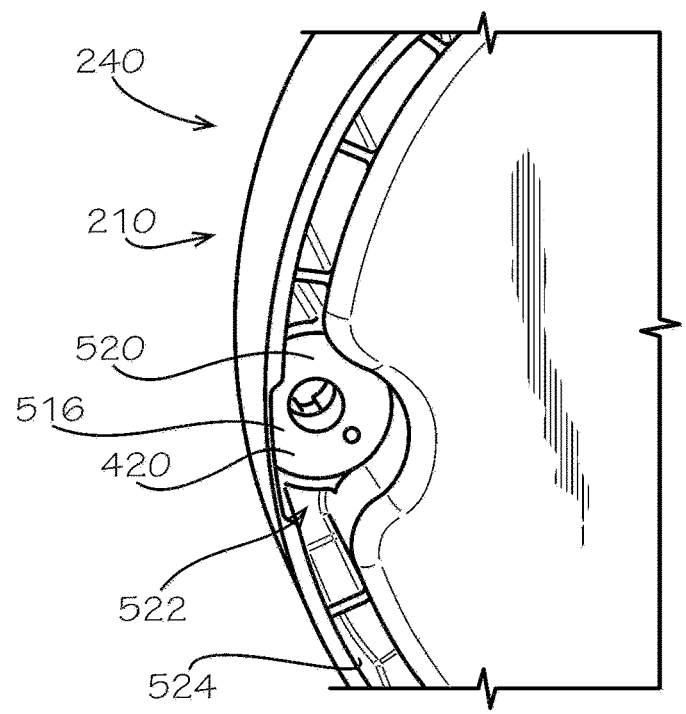
FIG. 5B is a bottom perspective view of the outer housing of FIG. 4, comprising the metal insert of FIG. 5A.

Referring to FIG. 5B, as shown, the metal insert 420 can be received within the gap 522 between the circumferential wall 312 and the internal wall 524. A contact surface 520 of the metal insert 420 can be exposed and can contact the corresponding metal post 332 (shown in FIG. 3A) of the inner housing 230 (shown in FIG. 2) when the inner housing 230 is assembled to the outer housing 240. In some aspects, the contact surface 520 can be the bottom surface 516. As such, when the inner housing 230 is connected to the fire hydrant 110 (shown in FIG. 1), there can be indirect metal-to-metal contact between the vibration sensor 380 and the fire hydrant 110. For example, in the present aspect, the metal fastener 408 of the vibration sensor 380 can be in contact with the metal insert 420, the metal insert 420 can be in contact with the corresponding metal post 332 of the metal inner housing 240, and the metal inner housing 240 can be in contact with the metal nozzle 140*a* of the metal fire hydrant 110. Moreover, the metal fire hydrant 110 can be connected to the metal stand pipe 198 of the fluid system (e.g., a water pipeline), and as such, there can be an indirect line of metal-to-metal contact between the vibration sensor 380 and the fluid system. As such, vibrations in the fluid system can be transmitted from the fluid system to the vibration sensor 380 through the metal along the line of metal-to-metal contact. With the vibration sensor 380 attached to the cap body 210, and the nozzle cap 150 (shown in FIG. 1) attached to the nozzle 140*a* (shown in FIG. 1), the vibration sensor 380 can detect vibrations from the fluid system (not shown) and convert the vibrations to a voltage signal. When the vibration sensor 380 is exposed to vibrations, the calibration masses 402 can oscillate axially relative to the base 400 which can produce internal stresses within the piezoelectric crystal. Stresses within the piezoelectric crystal can produce a voltage signal which can then be interpreted by the PCB 362 (shown in FIG. 3A) to determine if leaks are present within the fluid system.

Figure 5C:
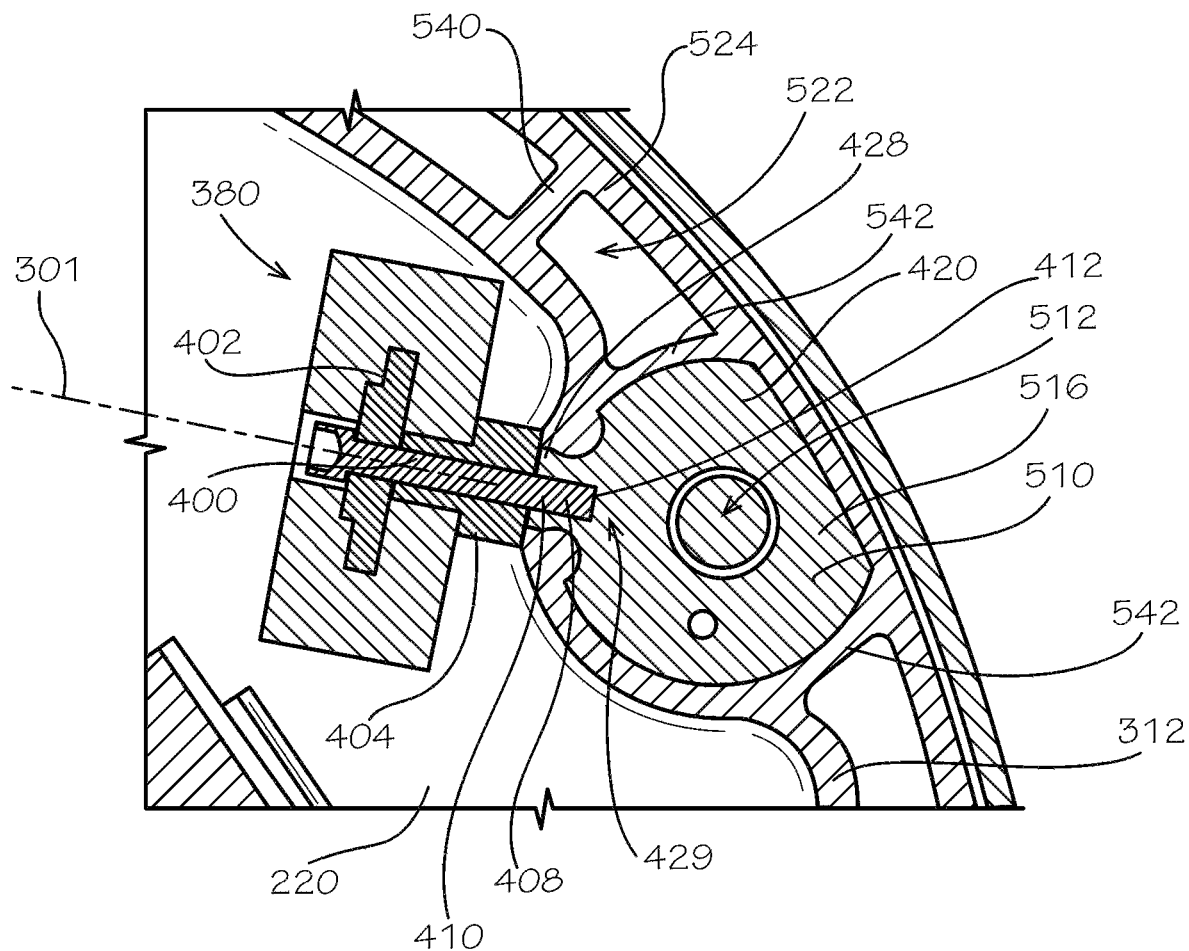
FIG. 5C is a cross-sectional detail view of the outer housing of FIG. 4, taken along line 5-5 in FIG. 3A.

FIG. 5C illustrates a cross-sectional view of the metal insert 420 engaged with the vibration sensor 380. As shown, in the present aspect, a plurality of ribs 540 can extend across the gap 522 between the circumferential wall 312 and the internal wall 524 for improved rigidity of the outer housing 240 (shown in FIG. 2). A pair of curved insert ribs 542 can be formed proximate the metal insert 420, as shown, such that the metal insert 420 can be surrounded by and molded with the curved insert ribs 542, the internal wall 524, and the circumferential wall 312.

Figure 6:
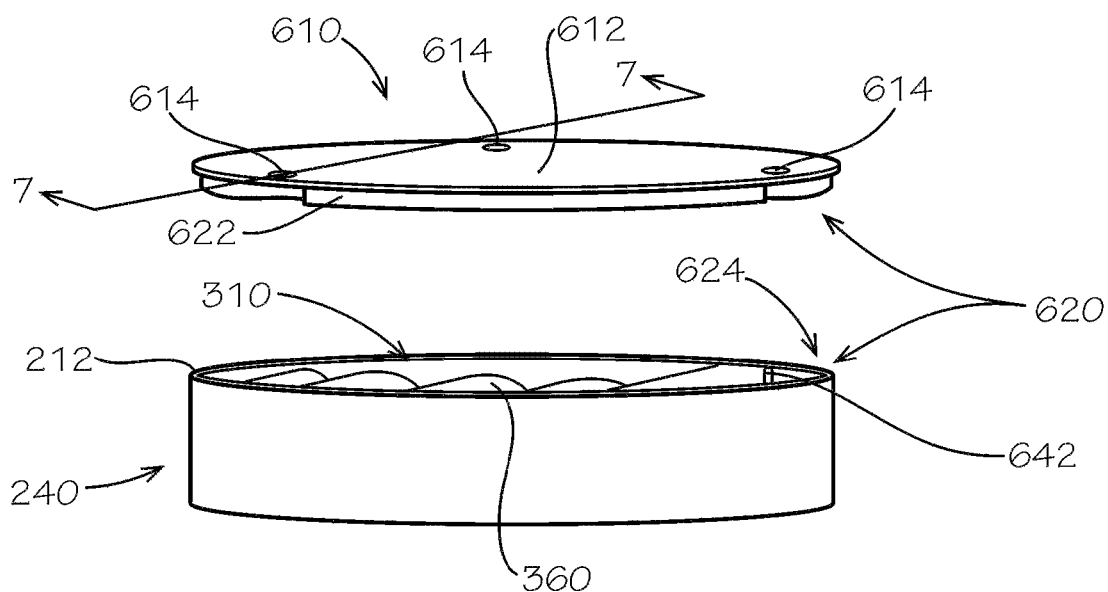
FIG. 6 is an exploded view of the outer housing of FIG. 4 and a housing lid therefor, according to another aspect of the present disclosure.

As illustrated in FIG. 6, some aspects of the cap body 210 (shown in FIG. 2) can further define a housing lid 610 configured to engage the outer housing 240 at the first body end 212 of the cap body 210. Example aspects of the housing lid 610 can be formed from a plastic material; however, other aspects of the housing lid 610 can be formed from any other suitable material known in the art. The housing lid 610 can be configured to cover the cavity 310, such that the cavity 310 is entirely enclosed by the outer housing 240 and the housing lid 610. Example aspects of the cap body 210 can define a tongue and groove joint 620, wherein a tongue 622 of the joint 620 can be formed on the housing lid 610, and a groove 624 of the joint 620 can be formed in the outer housing 240 at the first body end 212. In other aspects, the tongue 622 can be located on the outer housing 240 and the groove 624 can be formed in housing lid 610. The groove 624 can be configured to receive the tongue 622 therein. According to example aspects, the tongue 622 and the groove 624 of the tongue and groove joint 620 can be ultrasonically welded together to form a vapor and watertight seal between the housing lid 610 and the outer housing 240. Ultrasonic welding comprises applying high-frequency ultrasonic acoustic vibrations to two materials (e.g., the outer housing 240 and the housing lid 610) as they are held together under pressure in order to bond the two materials together. As such, the cavity 310 enclosed by the housing lid 610 and outer housing 240 can be protected from moisture, along with the sensitive electrical components received therein, such as the battery pack 360, the PCB 362 (shown in FIG. 3A), the vibration sensor 380 (shown in FIG. 6, and the antenna(s) 316 (shown in FIG. 3A). The watertight seal provided by the ultrasonic welding can eliminate the need to protect the electronic components through potting the electronic components within the cavity 310. In other aspects, the housing lid 610 and outer housing 240 can be joined together by any other suitable fastening means including, for example, traditional welding such as stick welding, mechanical fasteners, or the like. Furthermore, the outer housing 240 and the housing lid 610 can define a singular outer module, which can be easily removed from the nozzle cap 150 and replaced with a new outer module, as described above.

As shown, example aspects of the housing lid 610 can also comprise lid fastener holes 614 configured to align with the corresponding fastener holes 334, 344, 384 (shown in FIG. 3A) of the inner housing 230 (shown in FIG. 2), the outer housing 240, and the cap cover 280 (shown in FIG. 2), respectively. In example aspects, the outer housing 240 can define a locating pin 642 extending from the first body end 212, as shown. The locating pin 642 can be configured to engage a recess (not shown) in the housing lid 610 to aid in properly aligning the corresponding sets of lid and outer fastener holes 614, 344 (outer fastener holes 344 shown in FIG. 3A). In some aspects, the recess can be formed has a through-hole, such that the locating pin 642 can extend through a top surface 612 of the housing lid 610. The locating pin 642 can then further engage a recess (not shown) formed in the cap cover 280 (shown in FIG. 2) to aid in aligning the cap fastener holes 384 (shown in FIG. 3A) formed in the cap cover 280 with the lid and outer fastener holes 614, 344 of the housing lid 610 and the outer housing 240, respectively.

Figure 7A:
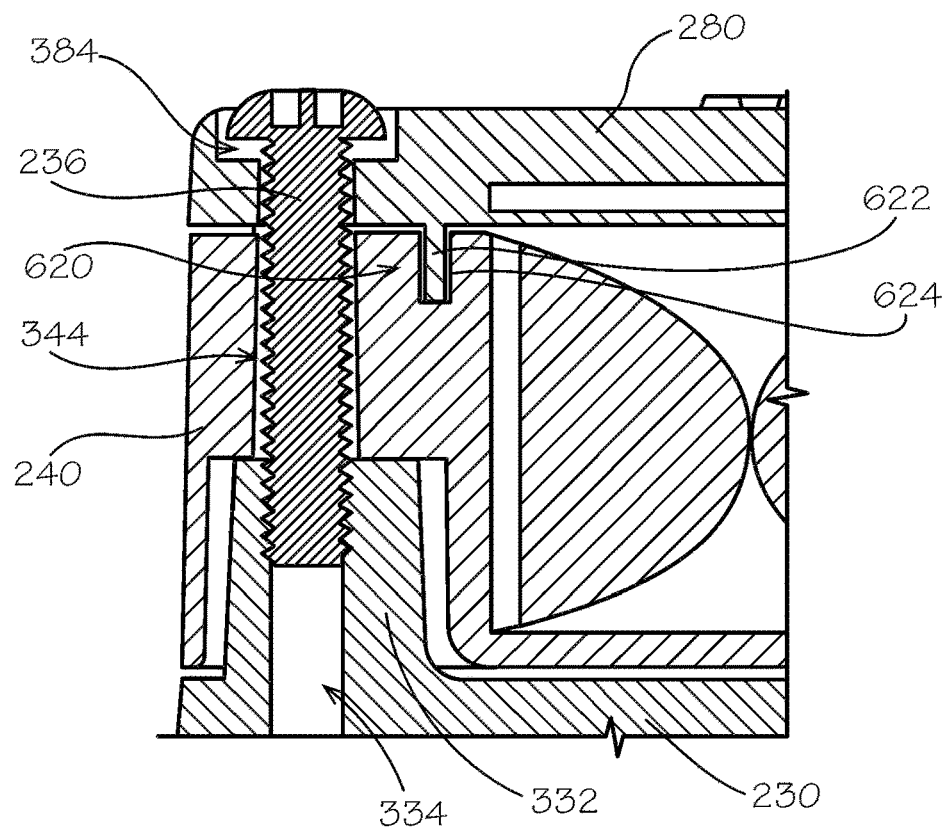
FIG. 7A is a cross-sectional detail view of the outer housing of FIG. 4 and the housing lid of FIG. 6, taken along line 7-7 in FIG. 6.
Figure 7B:
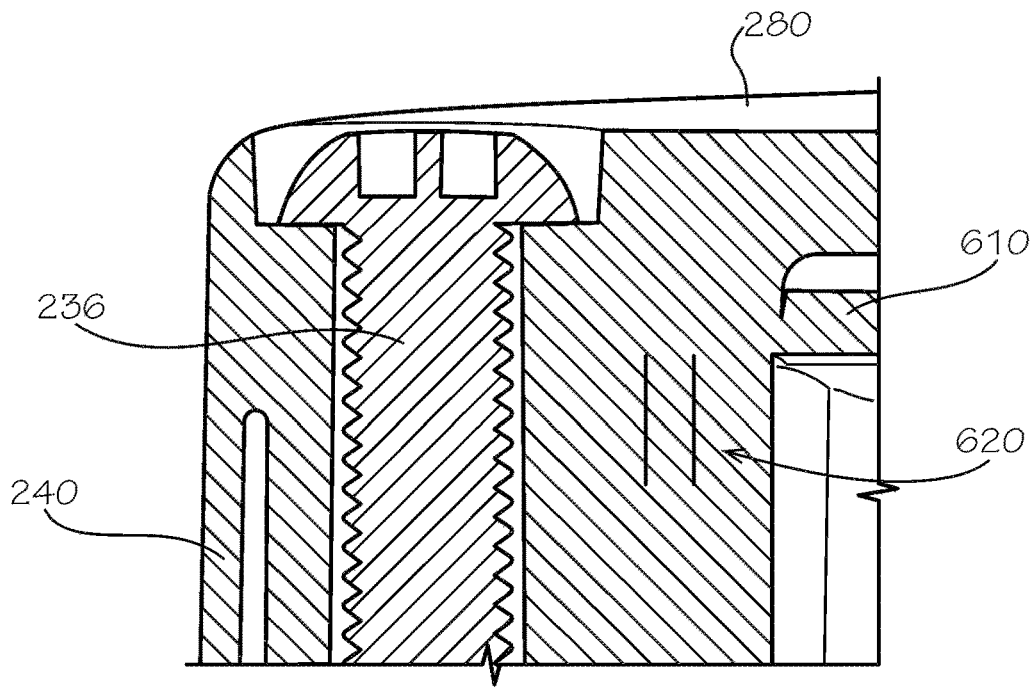
FIG. 7B is a cross-sectional detail view of the outer housing of FIG. 4 and the housing lid of FIG. 6, taken along line 7-7 in FIG. 6, wherein the outer housing is ultrasonically welded to the housing lid.

FIG. 7A illustrates a cross-sectional view of the outer housing 240 and the housing lid 610, taken along line 7-7 in FIG. 6, with the tongue 622 of the tongue and groove joint 620 received within the groove 624 of the joint 620. Once received therein, the tongue and groove joint 620 can be ultrasonically welded to seal the housing lid 610 with the outer housing 240. FIG. 7B illustrates a cross-sectional view of the outer housing 240 and the housing lid 610, taken along line 7-7 in FIG. 6, showing the ultra-sonically welded tongue and groove joint 620.

Figure 8:
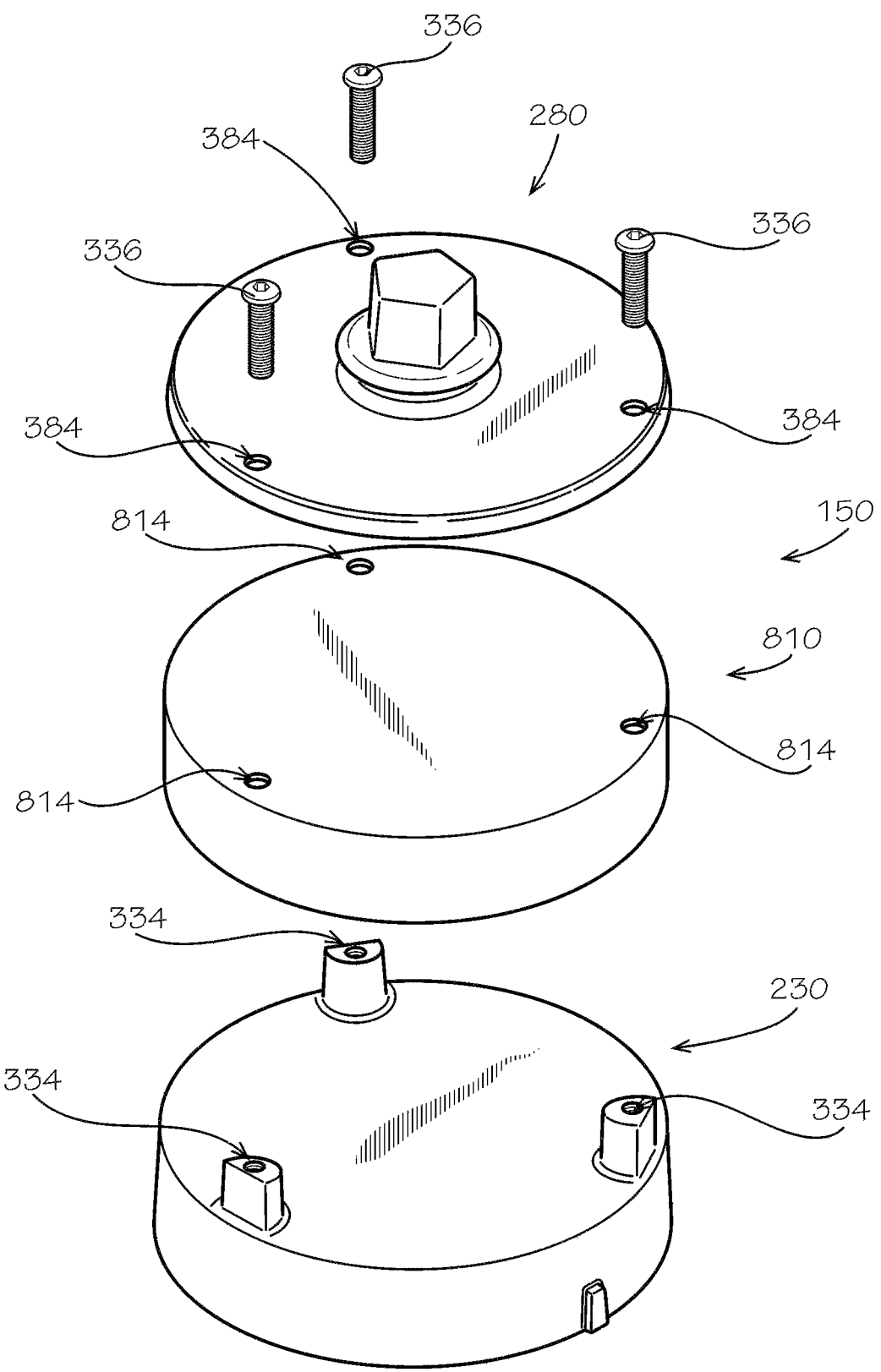
FIG. 8 illustrates an exploded view of the nozzle cap according to another aspect of the present disclosure.

FIG. 8 illustrates an exploded view of the nozzle cap 150, according to another aspect of the present disclosure. As shown, the nozzle cap 150 can comprise the inner housing 230 and the cap cover 280. In the present aspect, the nozzle cap 150 can further comprise the mechanical spacer 810 in place of the outer housing 240 (shown in FIG. 2). The spacer 810 can replace the outer housing 240 in aspects of the nozzle cap 150 that may not require the leak detection, processing, and communication capabilities described above. According to example aspects, the spacer 810 can be similar to or the same in size and shape to the outer housing 240. As shown, the spacer 810 can define spacer fastener holes 814 that can be aligned with the inner and cap fastener holes 334, 384 of the inner housing 230 and the cap cover 280, respectively, and through which the security screws 336 can be received to couple the inner housing 230, spacer 810, and cap cover 280 together. In some aspects, the spacer 810 can define a hollow interior (not shown), while in other aspects, the spacer 810 can be solid. The spacer 810 can be formed from any suitable material known in the art, including, for example, plastic, metal, or the like.

The mechanical spacer 810 can be removed from the modular nozzle cap 150 and replaced as desired. In instances where it may be desired to obtain the leak detection, processing, and communication capabilities of the outer housing 240 (shown in FIG. 2), the spacer 810 can be easily removed from the nozzle cap 150 and can be replaced with the outer housing 240. For example, the security screws 336 can be loosened or removed, such that the spacer 810 can be separated from the nozzle cap 150. The outer housing 240 can be aligned between the inner housing 230 and the cap cover 280, and the security screws 226 can be replaced and re-tightened to secure the outer housing 240 to the nozzle cap 150. Furthermore, as described above, in instances where it may be required to replace or repair the outer housing 240, the outer housing 240 can be removed in the same manner as the spacer 810, and a new or repaired outer housing 240 can be assembled to the nozzle cap 150.

Figure 9:
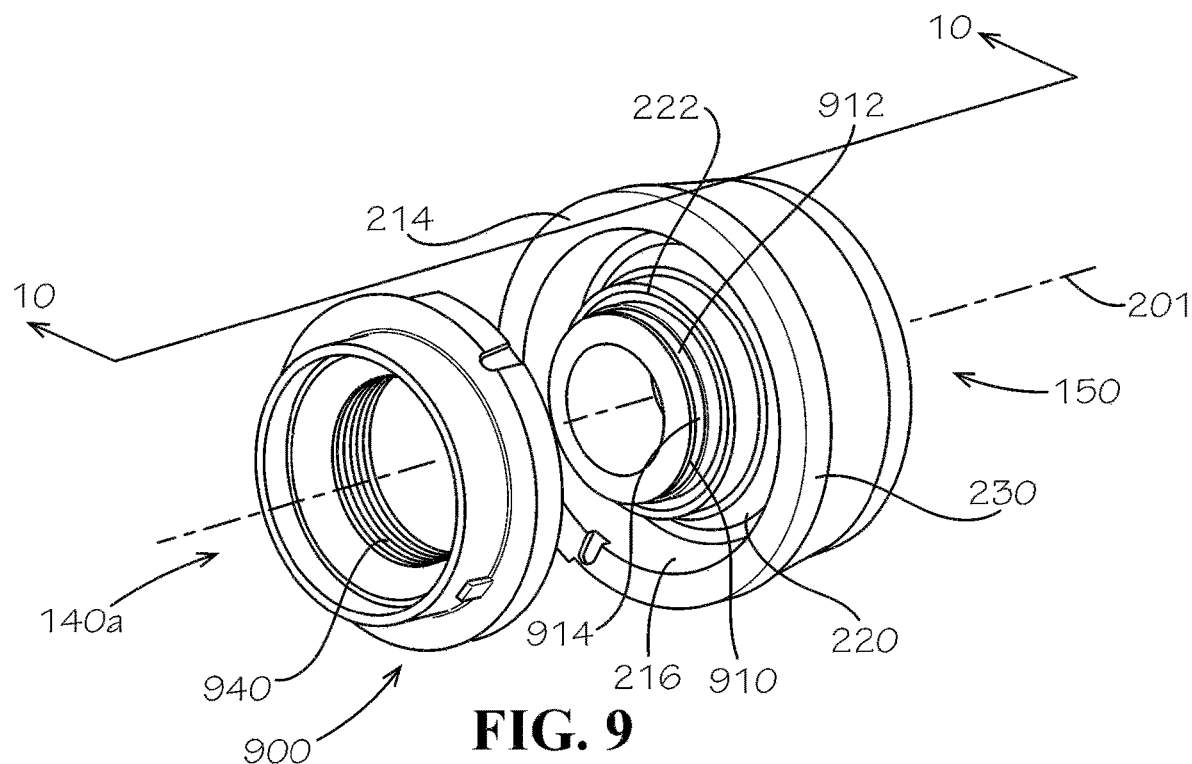
FIG. 9 illustrates an exploded view of the nozzle cap and the nozzle, according to another aspect of the present disclosure.
Figure 10:
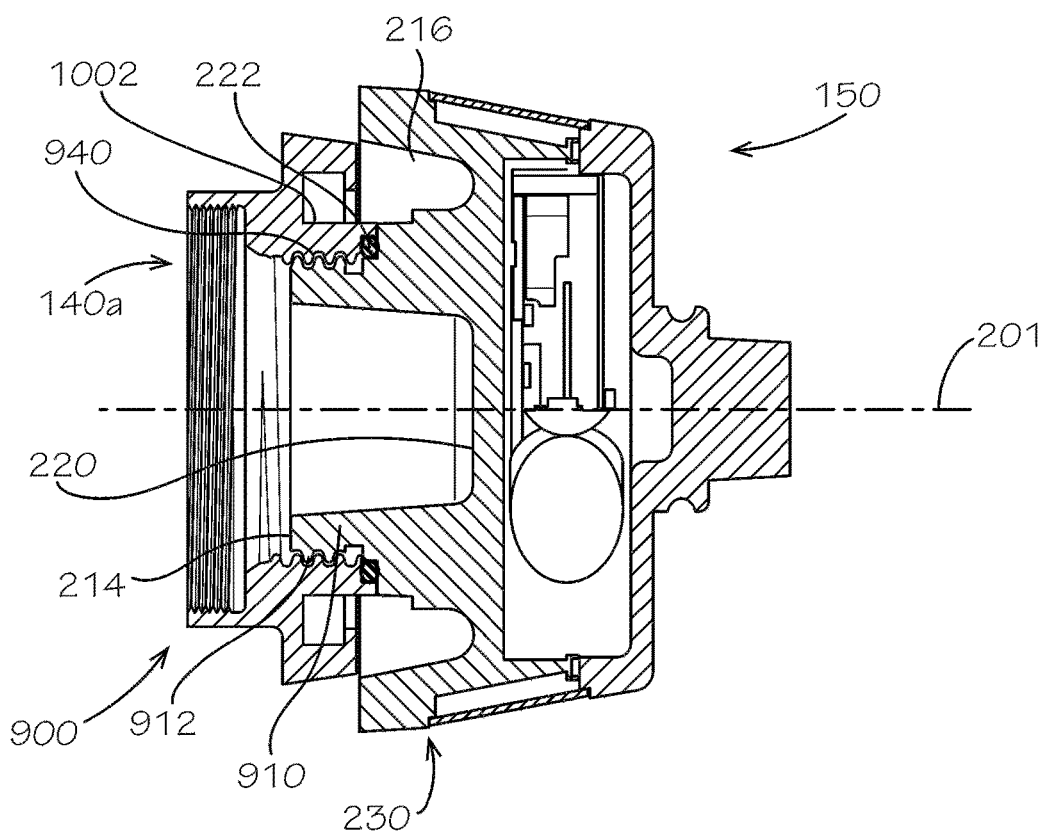
FIG. 10 illustrates a cross-sectional view of the nozzle cap of FIG. 9 mounted to the nozzle of FIG. 9, taken along line 10-10 in FIG. 9.

FIG. 9 illustrates an exploded view of the nozzle cap 150 and the nozzle 140a of the fire hydrant 110 (shown in FIG. 1), according to one aspect of the present disclosure, and FIG. 10 illustrates a cross sectional view of the nozzle cap 150 connected to the nozzle 140a, taken along line 10-10 in FIG. 9. As described above with reference to FIG. 2, the inner housing 230 can define the bore 216 extending from the second body end 214 to the inner wall 220. The bore 216 can define the cap axis 201, as shown. In some aspects, as shown, the bore 216 may not be threaded. In the present aspect, for example, the bore 216 can be un-threaded and the nozzle cap 150 can further define a threaded flange 910 extending from the inner wall 220 towards the second body end 214. The threaded flange 910 can define external threading 912 on an outer surface 914 thereof, as shown. The threaded flange 910 can be configured to engage internal threading 940 formed on the nozzle 140a. As shown, in the present aspect, the internal threading 940 of the nozzle 140a can define internal rope threading for attachment of the nozzle cap 150 to the nozzle 140a. Furthermore, in the present aspect, the nozzle 140a can be a Storz nozzle 900. The Storz nozzle 900 can define a non-threaded connection 1002 (shown in FIG. 10) for attachment with a Storz pumper hose (not shown). The Storz pumper hose can be attached with the non-threaded connection 1002 by a fast and easy quarter-turn action. The threaded flange 910 can be screwed onto the nozzle 140a by rotating the nozzle cap 150 about the cap axis 201. The gasket 222 can be configured to form a seal with the nozzle 140a when the nozzle cap 150 is screwed onto the nozzle 140a in the sealed position. Note, the nozzle cap 150 illustrated in FIGS. 9-10 is not a modular system; however, the various aspects of the modular nozzle cap 150 described above can be used in conjunction with the Storz nozzle 900 of the present aspect.

Figure 11:
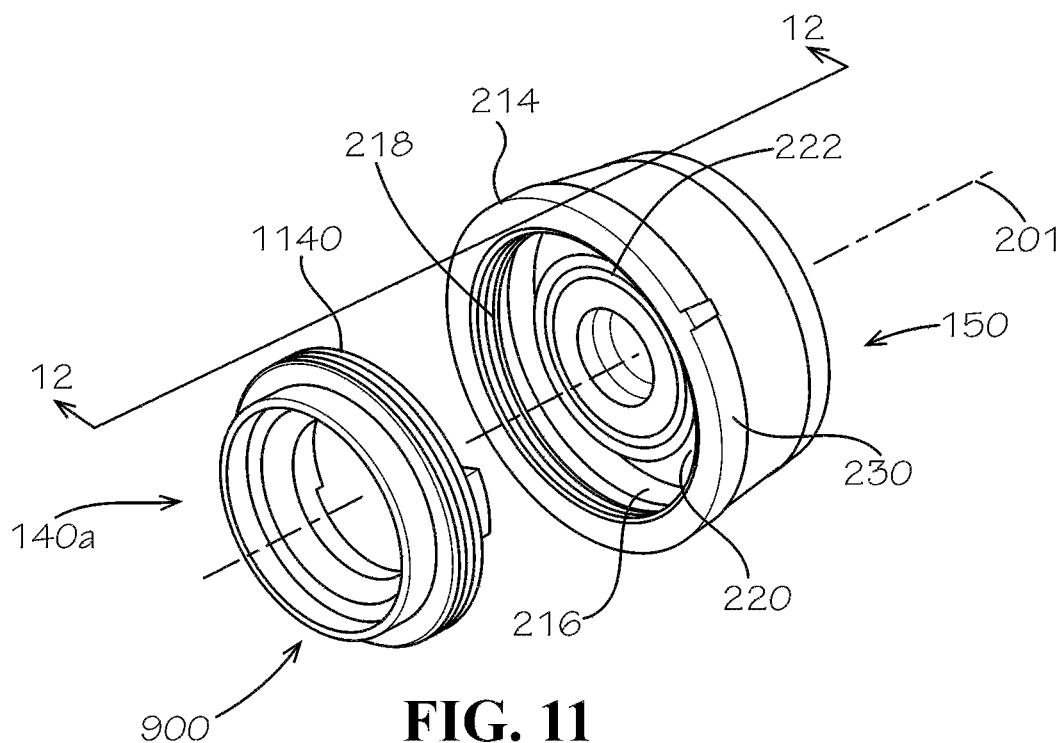
FIG. 11 illustrates an exploded view of the nozzle cap and the nozzle, according to another aspect of the present disclosure.
Figure 12:
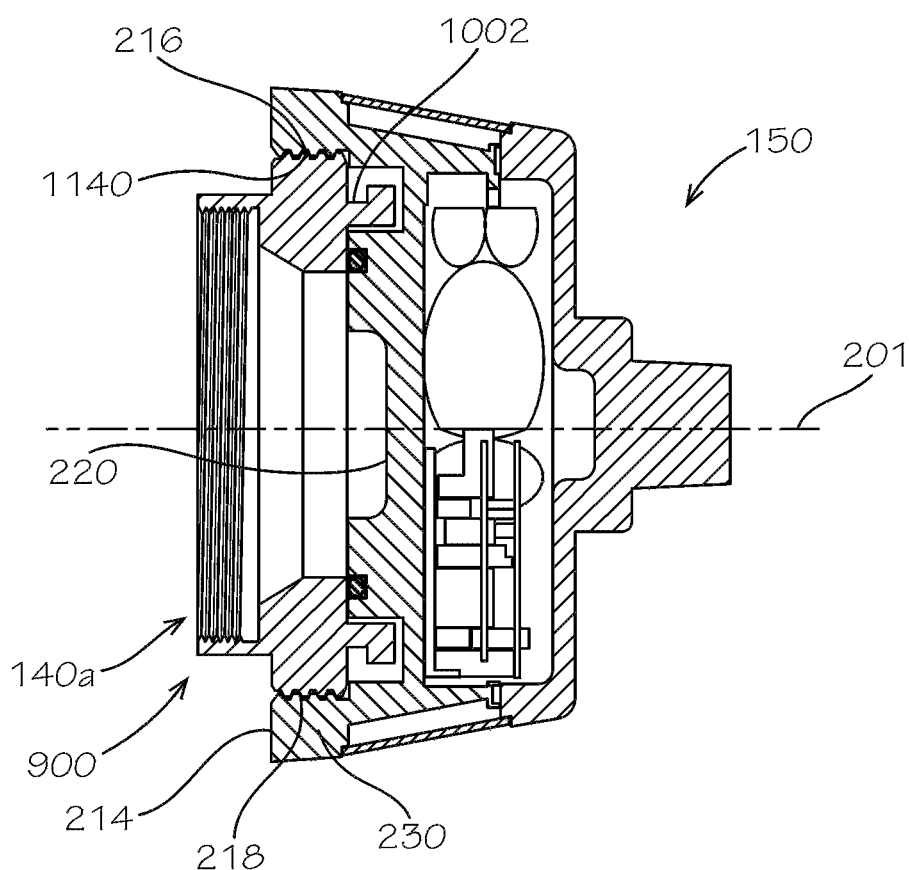
FIG. 12 illustrates a cross-sectional view of the nozzle cap of FIG. 11 mounted to the nozzle of FIG. 11, taken along line 12-12 of FIG. 11.

FIG. 11 illustrates an exploded view of the nozzle cap 150 and the nozzle 140a (for example, the Storz nozzle 900) according to another aspect of the present disclosure, and FIG. 12 illustrates a cross-sectional view of the nozzle cap 150 connected to the nozzle 140a, taken along like 12-12 in FIG. 11. In the present aspect, like the aspect of FIG. 2, the inner housing 230 can define the threaded bore 216, and the threaded bore 216 can define the internal threading 218. The nozzle 140a can define external threading 1140 configured to mate with the internal threading 218 of the inner housing 230. The threaded bore 216 can be screwed onto the nozzle 140a to mount the nozzle cap 150 on the nozzle 140a, and the gasket 222 can create a seal with the nozzle 140a when the nozzle cap 150 is screwed onto the nozzle 140a in the sealed position. Note, the nozzle cap 150 illustrated in FIGS. 11-12 is not a modular system; however, the various aspects of the modular nozzle cap 150 described above can be used in conjunction with the Storz nozzle 900 of the present aspect.

Figure 13:
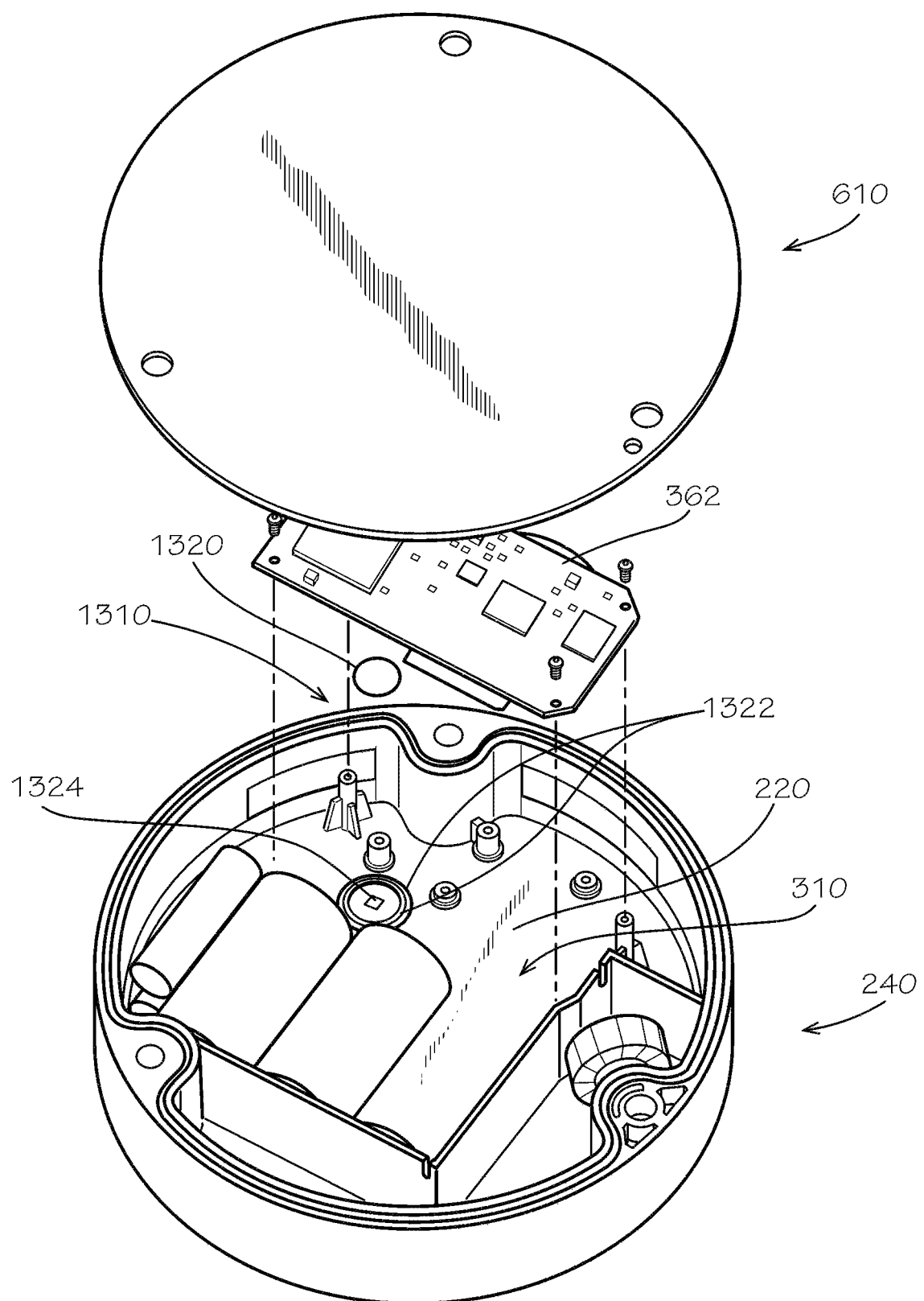
FIG. 13 illustrates an exploded view of the outer housing and the housing lid, according to another aspect of the present disclosure.

Referring to the exploded view of FIG. 13, in some aspects, the outer housing 240 can comprise a vent 1310, such as, for example, a Gore® vent. As shown, the vent 1310 can comprise a membrane 1320 mounted to the inner wall 220 of the cap body 210 (shown in FIG. 2). For example, the membrane 1320 can be mounted to ribs 1322 formed on the inner wall 220. In the present aspect, the ribs can be substantially circular in shape. (Note, in the exploded view of FIG. 13, the membrane 1320 is illustrated elevated above the circular ribs 1322.) In the present aspect, the membrane 1320 can be positioned beneath the PCB 362, relative to the orientation shown. A small opening 1324 or openings can be formed in the inner wall 220 beneath the membrane 1320. The membrane 1320 can allow airflow therethrough to allow for pressure equalization within the enclosed cavity 310 in instances where the cavity 310 is subjected to harmful pressure changes. Changes in pressure can place stresses on various components of the nozzle cap 150 (shown in FIG. 1), and the capability to equalize the pressure within the cavity 310 can reduce stresses and increase the lifespan of the nozzle cap 150. Example aspects of the membrane 1320 can also be waterproof and can prevent moisture and other undesirable elements, such as dirt, from entering the cavity 310.

Figure 14:
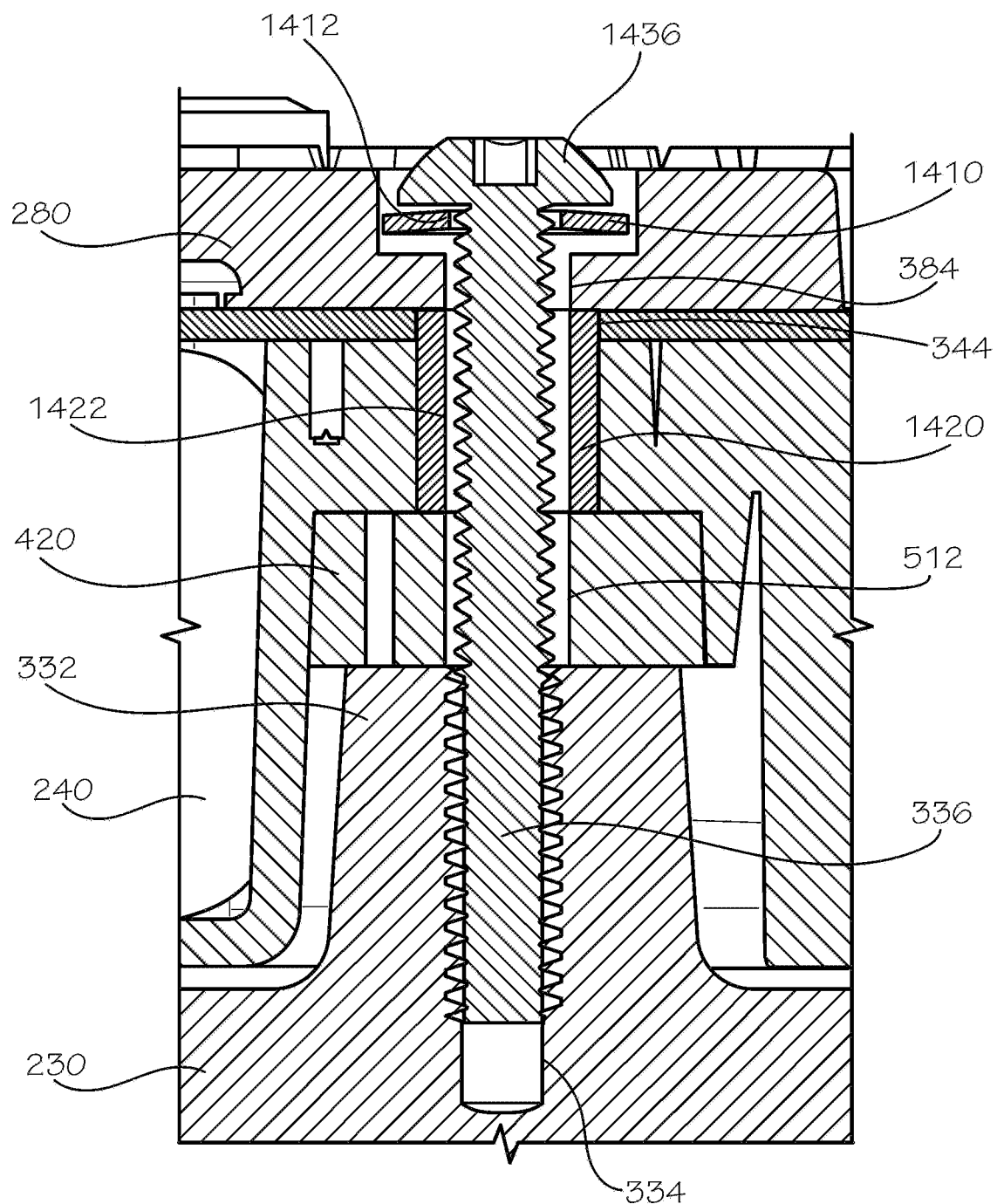
FIG. 14 illustrates a cross-sectional detail view of the nozzle cap of FIG. 1 taken along line 14-14 in FIG. 3.

FIG. 14 illustrates a detail cross-sectional view of the nozzle cap 150 (shown in FIG. 1), taken along line 14-14 in FIG. 3. As shown, one of the security screws 336 can extend through the corresponding fastener holes 334, 344, 384 of the inner housing 230, the outer housing 240, and the cap cover 280, respectively. The security screw 336 can also extend through the opening 512 of the metal insert 420. In some aspects, to aid in preventing or reducing deformation of the plastic outer housing 240, the nozzle cap 150 can comprise a disc spring 1410 positioned between the fastener hole 384 of the cap cover 280 and a head 1436 of the security screw 336, as shown. The disc spring 1410 can be, for example, a coned-disc spring (i.e., a Belleville washer), or any other suitable type of disc spring known in the art, and can be configured to deflect under a load. According to example aspects, the disc spring 1410 can define a disc opening 1412 through which the security screw 336 can extend. Each of the other security screws 336 of the nozzle cap 150 can also extend through a disc spring 1410 positioned between the corresponding head 1436 thereof and the corresponding fastener hole 384.

To further aid in reducing deformation of the outer housing 240, example aspects of the nozzle cap 150 can also comprise a compression limiter 1420 positioned between the cap cover 280 and the metal insert 420, as shown. Example aspects of the compression limiter 1420 can define a compression limiter opening 1422 through which the security screw 336 can extend. The compression limiter 1420 can be formed from a metal material, such as, for example, steel, aluminum, brass or any other suitable material known in the art, and can be configured to improve the structural integrity of the plastic joint at the corresponding fastener hole 344 in the outer housing 240. Each of the other security screws 336 can also extend through a compression limiter 1420. However, in some aspects, because the other security screws 336 do not extend through the metal insert 420, the corresponding compression limiters 1420 can extend fully between the cap cover 280 and the corresponding post 332 of the inner housing 230.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A nozzle cap for a fire hydrant comprising:
a cap body, the cap body comprising an inner housing and an outer housing, the outer housing defining a cavity, the inner housing defining an upper wall and a metal post extending from the upper wall, a lower wall of the outer housing abutting the upper wall and the metal post extending into the outer housing at the lower wall;
a vibration sensor received within the cavity and configured to detect leaks in a fluid system connected to the fire hydrant; and
a metal insert disposed within the outer housing, the metal insert contacting both of the vibration sensor and the metal post of the inner housing such that the vibration sensor is in metal-to-metal contact with the metal post.

2. The nozzle cap for the fire hydrant of claim 1, wherein:
the outer housing is formed from plastic; and
the metal insert is molded into the plastic of the outer housing.

3. The nozzle cap for the fire hydrant of claim 2, further comprising an antenna installed in the plastic of the outer housing.

4. The nozzle cap for the fire hydrant of claim 1, wherein:
the outer housing defines a circumferential wall at least partially enclosing the cavity; and
the metal insert is attached to the circumferential wall and is received in a gap between the circumferential wall and an internal wall of the outer housing.

5. The nozzle cap for the fire hydrant of claim 1, wherein:
the metal insert defines a connector;
the connector defines a threaded hole;
the vibration sensor defines a fastener; and
the fastener defines a threaded end configured to engage the threaded hole.

6. The nozzle cap for the fire hydrant of claim 1, wherein the inner housing comprises a metal material and defines one of a threaded bore and a threaded flange configured to mate with threading on a nozzle of the fire hydrant.

7. The nozzle cap for the fire hydrant of claim 1, wherein the inner housing is configured to mate with a Storz nozzle of the fire hydrant.

8. The nozzle cap for the fire hydrant of claim 1, wherein the metal post engages a contact surface of the metal insert.

9. The nozzle cap for the fire hydrant of claim 1, wherein the outer housing is configured to be interchangeable with a mechanical spacer.

10. The nozzle cap for the fire hydrant of claim 1, further comprising a cap cover configured to enclose the cavity, and wherein the outer housing comprises a gasket configured to create a watertight seal between the cap cover and the outer housing.

11. The nozzle cap for the fire hydrant of claim 1, wherein the vibration sensor is a piezoelectric sensor.

12. A nozzle cap for a fire hydrant comprising:
a cap cover comprising a metal material;
a cap body defining a cap axis, the cap body comprising:
an inner housing comprising a metal material; and
an outer housing comprising a non-metal material, the outer housing disposed axially between the inner housing and the cap cover, the outer housing comprising a bottom wall and a substantially circumferential wall extending from the bottom wall, the substantially circumferential wall and the bottom wall together defining a cavity, the bottom wall confronting the inner housing; and
a vibration sensor received within the cavity and configured to detect leaks in a fluid system connected to the fire hydrant.

13. The nozzle cap for the fire hydrant of claim 12, wherein the vibration sensor is in indirect metal-to-metal contact with the fluid system.

14. The nozzle cap for the fire hydrant of claim 12, further comprising a housing lid ultrasonically welded to the outer housing and configured to enclose the cavity.

15. The nozzle cap for the fire hydrant of claim 14, further comprising a tongue and a groove joint, the tongue and the groove joint comprising the tongue formed on one of the housing lid and the outer housing and a groove formed in the other of the housing lid and the outer housing.

16. The nozzle cap for the fire hydrant of claim 14, wherein;
the outer housing defines an outer fastener hole;
the housing lid defines a lid fastener hole; and
a fastener extends through the outer fastener hole and the lid fastener hole.

17. The nozzle cap for the fire hydrant of claim 16, wherein the outer housing further comprises a locating pin configured to engage a recess formed in the housing lid to align the outer fastener hole of the outer housing with the lid fastener hole of the housing lid.

18. The nozzle cap for the fire hydrant of claim 17, wherein:
the nozzle cap further comprises a cap cover defining a recess and a cap fastener hole; and
the locating pin extends through the recess of the housing lid and engages the recess of the cap cover to align the cap fastener hole with the outer fastener hole and the lid fastener hole.

19. The nozzle cap for the fire hydrant of claim 12, wherein:
the inner housing further comprises a membrane;
the membrane is configured to allow air to pass therethrough and to prohibit liquid from passing therethrough; and
the membrane is mounted to an inner wall of the cap body.

20. The nozzle cap for the fire hydrant of claim 12, wherein;
the vibration sensor defines a sensor axis; and
the cap axis extends perpendicular to the sensor axis.

21. The nozzle cap for the fire hydrant of claim 12, further comprising at least one of a disc spring and a compression limiter.

22. A modular nozzle cap for a fire hydrant comprising:
a cap cover defining a cap fastener hole;
a cap body cap body defining a cap axis, the cap body comprising:
an inner housing configured to engage the fire hydrant, the inner housing defining an inner fastener hole; and
an outer module disposed axially between and removably received between the inner housing and the cap cover, the outer module defining an outer fastener hole; and
a fastener engaging each of the cap fastener hole, inner fastener hole, and outer fastener hole to removably couple the outer module to the cap cover and the inner housing.

23. The modular nozzle cap for a fire hydrant of claim 22, wherein;
the outer module is an outer housing;
the outer housing defines a cavity; and
a vibration sensor is received within the cavity.

24. The modular nozzle cap of claim 23, further comprising a housing lid ultrasonically welded to the outer housing to enclose the cavity.

25. The modular nozzle cap for a fire hydrant of claim 22, wherein the outer module is a mechanical spacer.

26. The modular nozzle cap for a fire hydrant of claim 22, wherein the fastener is a security screw configured to threadably engage the inner fastener hole of the inner housing.

27. A nozzle cap for a fire hydrant comprising:
a cap cover comprising a metal material;
a cap body comprising:
  an inner housing comprising a metal material;
  an outer housing comprising a non-metal material, the outer housing received between the inner housing and the cap cover, the outer housing defining a cavity and an outer fastener hole;
  a housing lid ultrasonically welded to the outer housing and configured to enclose the cavity, the housing lid defining a lid fastener hole; and
  a fastener extending through the outer fastener hole and the lid fastener hole; and
a vibration sensor received within the cavity and configured to detect leaks in a fluid system connected to the fire hydrant;
wherein the outer housing further comprises a locating pin configured to engage a recess formed in the housing lid to align the outer fastener hole of the outer housing with the lid fastener hole of the housing lid;
wherein the nozzle cap further comprises a cap cover defining a recess and a cap fastener hole; and
wherein the locating pin extends through the recess of the housing lid and engages the recess of the cap cover to align the cap fastener hole with the outer fastener hole and the lid fastener hole.

28. A nozzle cap for a fire hydrant comprising:
a cap cover comprising a metal material;
a cap body comprising:
  an inner housing comprising a metal material, the inner housing further comprising a membrane, the membrane configured to allow air to pass therethrough and to prohibit liquid from passing therethrough, the membrane mounted to an inner wall of the cap body; and
  an outer housing comprising a non-metal material, the outer housing received between the inner housing and the cap cover, the outer housing defining a cavity; and
a vibration sensor received within the cavity and configured to detect leaks in a fluid system connected to the fire hydrant.

29. A nozzle cap for a fire hydrant comprising:
a cap cover comprising a metal material;
a cap body defining a cap axis, the cap body comprising:
  an inner housing comprising a metal material; and
  an outer housing comprising a non-metal material, the outer housing received between the inner housing and the cap cover, the outer housing defining a cavity; and
a vibration sensor received within the cavity and configured to detect leaks in a fluid system connected to the fire hydrant, the vibration sensor defining a sensor axis, wherein the cap axis extends perpendicular to the sensor axis.

* * * * *